US012223895B2

(12) United States Patent
Li et al.

(10) Patent No.: US 12,223,895 B2
(45) Date of Patent: Feb. 11, 2025

(54) PIXEL CIRCUITRY, PIXEL DRIVING METHOD AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Chunyang Li, Beijing (CN); Hsinwei Huang, Beijing (CN); Tsanghong Wang, Beijing (CN); Man Yuan, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,858

(22) PCT Filed: Mar. 25, 2022

(86) PCT No.: PCT/CN2022/083081
§ 371 (c)(1),
(2) Date: Feb. 17, 2023

(87) PCT Pub. No.: WO2023/178663
PCT Pub. Date: Sep. 28, 2023

(65) Prior Publication Data
US 2024/0274072 A1 Aug. 15, 2024

(51) Int. Cl.
*G09G 3/3233* (2016.01)

(52) U.S. Cl.
CPC ... *G09G 3/3233* (2013.01); *G09G 2300/0852* (2013.01); *G09G 2310/061* (2013.01);
(Continued)

(58) Field of Classification Search
USPC ........................................................ 345/204
See application file for complete search history.

(56) References Cited

U.S. PATENT DOCUMENTS

2011/0096051 A1* 4/2011 Huangfu ........... G02F 1/136213
345/92
2014/0300594 A1* 10/2014 Aubert .................. G09G 3/348
345/212
(Continued)

FOREIGN PATENT DOCUMENTS

CN 109523956 A 3/2019
CN 111696484 A 9/2020
(Continued)

*Primary Examiner* — Amy Onyekaba
(74) *Attorney, Agent, or Firm* — WHDA, LLP

(57) ABSTRACT

A pixel circuitry, a pixel driving method and a display device are provided. The pixel circuitry includes a first light-emission control circuitry, a driving circuitry, a second light-emission control circuitry, a resetting control circuitry and a light-emitting element. The resetting control circuitry is electrically connected to a resetting control line, a connection node and a first initial voltage end for providing a first initial voltage, and configured to apply the first initial voltage to the connection node under the control of a resetting control signal from the resetting control line. The connection node is a first node, a third node or a fourth node. According to the present disclosure, it is able to suppress the occurrence of flicker.

18 Claims, 15 Drawing Sheets

(52) U.S. Cl.
CPC ............... *G09G 2320/0247* (2013.01); *G09G 2330/021* (2013.01)

(56) References Cited

U.S. PATENT DOCUMENTS

| | | | | |
|---|---|---|---|---|
| 2017/0110056 | A1* | 4/2017 | Hu | G09G 3/3258 |
| 2020/0126478 | A1* | 4/2020 | Lee | G09G 3/325 |
| 2020/0184893 | A1* | 6/2020 | Dong | G09G 3/3233 |
| 2021/0027696 | A1* | 1/2021 | Kim | G09G 3/3233 |
| 2021/0225264 | A1* | 7/2021 | Xuan | G09G 3/32 |
| 2022/0310016 | A1* | 9/2022 | Yang | G09G 3/3266 |
| 2023/0042603 | A1* | 2/2023 | Huangfu | G09G 3/3233 |
| 2023/0145805 | A1* | 5/2023 | Kim | G09G 3/2096 345/691 |
| 2023/0206849 | A1* | 6/2023 | Tian | G09G 3/3233 345/691 |

FOREIGN PATENT DOCUMENTS

| | | | |
|---|---|---|---|
| CN | 112309316 | A | 2/2021 |
| CN | 112908258 | A | 6/2021 |
| CN | 113744683 | A | 12/2021 |
| CN | 113838415 | A | 12/2021 |
| CN | 113870786 | A | 12/2021 |

* cited by examiner

PIXEL CIRCUITRY, PIXEL DRIVING METHOD AND DISPLAY DEVICE

CROSS-REFERENCE TO RELATED APPLICATION

The present application is the U.S. national phase of PCT Application No. PCT/CN2022/083081 filed on Mar. 25, 2022, which is incorporated herein by reference in its entirety.

TECHNICAL FIELD

The present disclosure relates to the field of display technology, in particular to a pixel circuitry, a pixel driving method and a display device.

BACKGROUND

In related art, during the operation of a pixel circuitry, at a non-light-emitting stage, residual electric charges at a previous light-emitting stage may remain in a parasitic capacitor at a first node (a node electrically connected to a first end of a driving circuitry), and a current leakage occurs for a first voltage end through a transistor of a first light-emission control circuitry, so a certain amount of electric charges are accumulated at the first node when the pixel circuitry enters the light-emitting stage again. As a result, brightness values increase gradually within a same display period, and thereby flicker occurs.

SUMMARY

In one aspect, the present disclosure provides in some embodiments a pixel circuitry, including a first light-emission control circuitry, a driving circuitry, a second light-emission control circuitry, a resetting control circuitry and a light-emitting element. The first light-emission control circuitry is electrically connected to a light-emission control line, a first voltage end and a first node, and configured to control the first voltage end to be electrically connected to or electrically disconnected from the first node under the control of a light-emission control signal from the light-emission control line. A control end of the driving circuitry is electrically connected to a second node, a first end of the driving circuitry is electrically connected to the first node, and a second end of the driving circuitry is electrically connected to a third node. The driving circuitry is configured to generate a driving current for driving the light-emitting element under the control of a potential at the control end. The second light-emission control circuitry is electrically connected to the light-emission control line, the third node and a fourth node, and configured to control the third node to be electrically connected to or electrically disconnected from the fourth node under the control of the light-emission control signal. A first electrode of the light-emitting element is electrically connected to the fourth node, and a second electrode of the light-emitting element is electrically connected to a second voltage end. The resetting control circuitry is electrically connected to a resetting control line, a connection node and a first initial voltage end for providing a first initial voltage, and configured to provide the first initial voltage to the connection node under the control of a resetting control signal from the resetting control line. The connection node is the first node, the third node or the fourth node.

Optionally, the resetting control circuitry is further electrically connected to a fifth node, and configured to, under the control of the resetting control signal, control the first initial voltage end to be electrically connected to or electrically disconnected from the fifth node, control the fifth node to be electrically connected to or electrically disconnected from the connection node, and maintain a potential at the fifth node.

Optionally, the resetting control circuitry includes a first control circuitry, a second control circuitry and a first energy storage circuitry. The first control circuitry is electrically connected to the resetting control line, the connection node and the fifth node, and configured to control the connection node to be electrically connected to or electrically disconnected from the fifth node under the control of the resetting control signal. The second control circuitry is electrically connected to the resetting control line, the fifth node and the first initial voltage end, and configured to write the first initial voltage from the first initial voltage end into the fifth node under the control of the resetting control signal. The first energy storage circuitry is electrically connected to the fifth node, and configured to store electric energy.

Optionally, the resetting control line is the light-emission control line, or the resetting control signal from the resetting control line is the same as the light-emission control signal from the light-emission control line.

Optionally, the first control circuitry includes a first transistor and the second control circuitry includes a second transistor. A control electrode of the first transistor is electrically connected to the resetting control line, a first electrode of the first transistor is electrically connected to the fifth node, and a second electrode of the first transistor is electrically connected to the third node. A control electrode of the second transistor is electrically connected to the resetting control line, a first electrode of the second transistor is electrically connected to the first initial voltage end, and a second electrode of the second transistor is electrically connected to the fifth node.

Optionally, the first transistor is an oxide thin film transistor, and the second transistor is a low temperature polysilicon thin film transistor.

Optionally, the first energy storage circuitry includes a first capacitor, a first end of which is electrically connected to the fifth node, and a second end of which is electrically connected to the first voltage end.

Optionally, the pixel circuitry further includes a data write-in circuitry, a compensation control circuitry, a first initialization circuitry, a second energy storage circuitry and a second initialization circuitry. The data write-in circuitry is electrically connected to a write-in control line, a data line and the first node, and configured to write a data voltage from the data line into the first node under the control of a write-in control signal from the write-in control line. The compensation control circuitry is electrically connected to a compensation control line, the control end of the driving circuitry and the second end of the driving circuitry, and configured to control the control end of the driving circuitry to be electrically connected to or electrically disconnected from the second end of the driving circuitry under the control of a compensation control signal from the compensation control line. The first initialization circuitry is electrically connected to an initialization control line, a second initial voltage end and the control end of the driving circuitry, and configured to write a second initial voltage from the second initial voltage end into the control end of the driving circuitry under the control of an initialization control signal from the initialization control line. The second energy storage circuitry is electrically connected to the control end of the driving circuitry, and configured to store electric energy. The second initialization circuitry is electrically connected to the write-in control line, a third initial voltage end and the fourth node, and configured to write a third initial voltage from the third initial voltage end into the fourth node under the control of the write-in control signal.

Optionally, the first light-emission control circuitry includes a third transistor, the second light-emission control circuitry includes a fourth transistor, and the driving circuitry includes a driving transistor. A control electrode of the third transistor is electrically connected to the light-emission control line, a first electrode of the third transistor is electrically connected to the first voltage end, and a second electrode of the third transistor is electrically connected to the first node. A control electrode of the fourth transistor is electrically connected to the light-emission control line, a first electrode of the fourth transistor is electrically connected to the third node, and a second electrode of the fourth transistor is electrically connected to the fourth node. A control electrode of the driving transistor is electrically connected to the second node, a first electrode of the driving transistor is electrically connected to the first node, and a second electrode of the driving transistor is electrically connected to the third node.

Optionally, the data write-in circuitry includes a fifth transistor, the compensation control circuitry includes a sixth transistor, the first initialization circuitry includes a seventh transistor, the second initialization circuitry includes an eighth transistor, and the second energy storage circuitry includes a second capacitor. A control electrode of the fifth transistor is electrically connected to the write-in control line, a first electrode of the fifth transistor is electrically connected to the data line, and a second electrode of the fifth transistor is electrically connected to the first end of the driving circuitry. A control electrode of the sixth transistor is electrically connected to the compensation control line, a first electrode of the sixth transistor is electrically connected to the control end of the driving circuitry, and a second electrode of the sixth transistor is electrically connected to the second end of the driving circuitry. A control electrode of the seventh transistor is electrically connected to the initialization control line, a first electrode of the seventh transistor is electrically connected to the second initial voltage end, and a second electrode of the seventh transistor is electrically connected to the control end of the driving circuitry. A control electrode of the eighth transistor is electrically connected to the write-in control line, a first electrode of the eighth transistor is electrically connected to the third initial voltage end, and a second electrode of the eighth transistor is electrically connected to the fourth node. A first end of the second capacitor is electrically connected to the second node, and a second end of the second capacitor is electrically connected to the first voltage end.

In another aspect, the present disclosure provides in some embodiments a pixel driving method for the above-mentioned pixel circuitry. A display period includes a non-light-emitting stage and a light-emitting stage. The pixel driving method includes, at the non-light-emitting stage, applying, by a resetting control circuitry, a first initial voltage to a connection node under the control of a resetting control signal.

Optionally, the resetting control circuitry includes a first control circuitry, a second control circuitry and a first energy storage circuitry. The pixel driving method includes: at the light-emitting stage, writing, by the second control circuitry, the first initial voltage into a fifth node under the control of the resetting control signal, and storing, by the first energy storage circuitry, the first initial voltage in the fifth node; and at the non-light-emitting stage, controlling, by the first control circuitry, the fifth node to be electrically connected to the connection node under the control of the resetting control signal, to write the first initial voltage into the connection node.

Optionally, the pixel circuitry further includes a data write-in circuitry, a compensation control circuitry, a first initialization circuitry, a second energy storage circuitry and a second initialization circuitry. A first display stage of the display period includes an initialization stage, a compensation stage and the light-emitting stage arranged sequentially in that order, and the compensation stage includes a data write-in stage. The pixel driving method includes: at the initialization stage, writing, by the first initialization circuitry, a second initial voltage into a control end of a driving circuitry under the control of the resetting control signal, so that the driving circuitry controls a first node to be electrically connected to a third node at the beginning of the compensation stage under the control of a potential at a control end of the driving circuitry; at the data write-in stage, writing, by the data write-in circuitry, a data voltage Vdata from a data line into the first node under the control of a write-in control signal; at the compensation stage, controlling, by the compensation control circuitry, a second node to be electrically connected to the third node under the control of a compensation control signal; and at the light-emitting stage, controlling, by a first light-emission control circuitry, a first voltage end to be electrically connected to the first node under the control of a light-emission control signal, and controlling, by a second light-emission control circuitry, the third node to be electrically connected to the fourth node under the control of the light-emission control signal, so that the driving circuitry generates a driving current for driving a light-emitting element.

Optionally, the pixel circuitry further includes a data write-in circuitry, the non-light-emitting stage includes a data write-in stage, a display frame includes a refresh display sub-frame and at least one maintenance display sub-frame, the refresh display sub-frame includes the display period, and the maintenance display sub-frame includes the display period. The pixel driving method further includes: within the maintenance display sub-frame, providing, by the data line, a first voltage signal; and at the data write-in stage within the maintenance display sub-frame, writing, by the data write-in circuitry, the first voltage signal into the first node under the control of the write-in control signal.

Optionally, the pixel circuitry further includes a compensation control circuitry, and the display period further includes a compensation stage. The pixel driving method further includes: at the data write-in stage within the refresh display sub-frame, providing, by the data line, a data voltage, and writing, by the data write-in circuitry, the data voltage into the first node under the control of the write-in control signal; at the compensation stage within the refresh display sub-frame, controlling, by the compensation control circuitry, the control end of the driving circuitry to be electrically connected to a second end of the driving circuitry under the control of the compensation control signal; at the light-emitting stage within the refresh display sub-frame and at the light-emitting stage within the maintenance display sub-frame, controlling, by the first light-emission control circuitry, the first voltage end to be electrically connected to the first node under the control of the light-emission control signal, and controlling, by the second light-emission control circuitry, the third node to be electrically connected to the fourth node under the control of the light-emission control signal, so that the driving circuitry generates the driving current for driving the light-emitting element; and within the maintenance display sub-frame, controlling, by the compensation control circuitry, the control end of the driving circuitry to be electrically disconnected from the second end of the driving circuitry under the control of the compensation control signal.

Optionally, within the display frame, a frequency of the write-in control signal is smaller than a frequency of the light-emission control signal.

In yet another aspect, the present disclosure provides in some embodiments a display device including the above-mentioned pixel circuitry.

DETAILED DESCRIPTION

Figure 1:
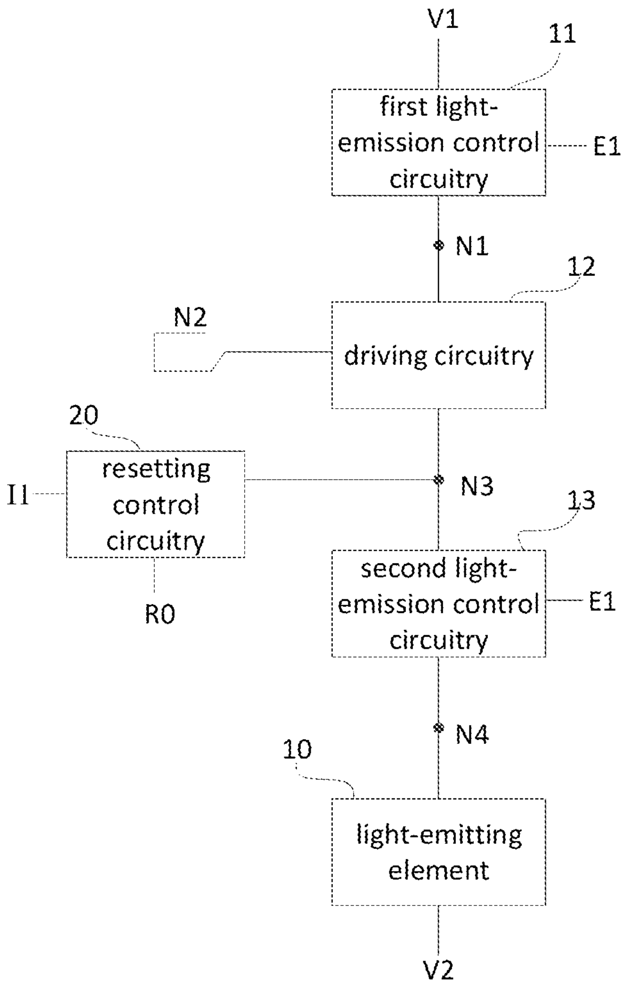
FIG. 1 is a schematic view showing a pixel circuitry according to at least one embodiment of the present disclosure.

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In the embodiments of the present disclosure, in order to differentiate two electrodes other than a control electrode from each other, one of the two electrodes is called as first electrode and the other is called as second electrode.

In actual use, when the transistor is a TFT or FET, the first electrode may be a drain electrode and the second electrode may be a source electrode, or the first electrode may be a source electrode and the second electrode may be a drain electrode.

The present disclosure provides in some embodiments a pixel circuitry, which includes a first light-emission control circuitry, a driving circuitry, a second light-emission control circuitry, a resetting control circuitry and a light-emitting element. The first light-emission control circuitry is electrically connected to a light-emission control line, a first voltage end and a first node, and configured to control the first voltage end to be electrically connected to or electrically disconnected from the first node under the control of a light-emission control signal from the light-emission control line. A control end of the driving circuitry is electrically connected to a second node, a first end of the driving circuitry is electrically connected to the first node, and a second end of the driving circuitry is electrically connected to a third node. The driving circuitry is configured to generate a driving current for driving the light-emitting element under the control of a potential at the control end. The second light-emission control circuitry is electrically connected to the light-emission control line, the third node and a fourth node, and configured to control the third node to be electrically connected to or electrically disconnected from the fourth node under the control of the light-emission control signal. A first electrode of the light-emitting element is electrically connected to the fourth node, and a second electrode of the light-emitting element is electrically connected to a second voltage end. The resetting control circuitry is electrically connected to a resetting control line, a connection node and a first initial voltage end for providing a first initial voltage, and configured to provide the first initial voltage to the connection node under the control of a resetting control signal from the resetting control line. The connection node is the first node, the third node or the fourth node.

During the operation of the pixel circuitry, a display period includes a non-light-emitting stage and a light-emitting stage. At the non-light-emitting stage, the resetting control circuitry applies the first initial voltage to the connection node under the control of the resetting control signal, so that superfluous electric charges additionally accumulated at the first node are cancelled out by the first initial voltage applied to the connection node at the beginning of the light-emitting stage. In this way, it is able to inhibit such a phenomenon that brightness values increase gradually within a same display period (the display period may be, but not limited to, one frame), thereby to suppress the occurrence of flicker.

In at least one embodiment of the present disclosure, the first voltage end may be, but not limited to, a high voltage end, and the second voltage end may be, but not limited to, a low voltage end.

In a possible embodiment of the present disclosure, the light-emitting element may be, but not limited to, an organic light-emitting diode.

In at least one embodiment of the present disclosure, the non-light-emitting stage may include, but not limited to, a time period in the display period other than the light-emitting stage.

In at least one embodiment of the present disclosure, the resetting control line is the light-emission control line, or the resetting control signal from the resetting control line and the light-emission control signal from the light-emission control line are one same control signal. However, the present disclosure is not limited thereto.

In at least one embodiment of the present disclosure, the resetting control circuitry is further electrically connected to a fifth node, and configured to, under the control of the resetting control signal, control the first initial voltage end to be electrically connected to or electrically disconnected from the fifth node, control the fifth node to be electrically connected to or electrically disconnected from the connection node, and maintain a potential at the fifth node.

In a possible embodiment of the present disclosure, a value of the first initial voltage may be greater than or equal to −3V and smaller than or equal to −2.3V. For example, the first initial voltage may be, but not limited to, −3V, −2.3V, −2.4V, −2.5V or −2.8V.

In at least one embodiment of the present disclosure, as shown in FIG. 1, the pixel circuitry includes a first light-emission control circuitry 11, a driving circuitry 12, a second light-emission control circuitry 13, a resetting control circuitry 20 and a light-emitting element 10. The first light-emission control circuitry 11 is electrically connected to a light-emission control line E1, a first voltage end V1 and a first node N1, and configured to control the first voltage end V1 to be electrically connected to the first node N1 under the control of a light-emission control signal from the light-emission control line E1. The first voltage end V1 is configured to provide a first voltage signal. A control end of the driving circuitry 12 is electrically connected to a second node N2, a first end of the driving circuitry 12 is electrically connected to the first node N1, and a second end of the driving circuitry 12 is electrically connected to a third node N3. The driving circuitry is configured to generate a driving current for driving the light-emitting element 10 under the control of a potential at the control end of the driving circuitry. The second light-emission control circuitry 13 is electrically connected to the light-emission control line E1, the third node N3 and a fourth node N4, and configured to control the third node N3 to be electrically connected to the fourth node N4 under the control of the light-emission control signal. A first electrode of the light-emitting element 10 is electrically connected to the fourth node N4, and a second electrode of the light-emitting element 10 is electrically connected to a second voltage end V2. The resetting control circuitry 20 is electrically connected to a resetting control line R0, the third node N3 and a first initial voltage end I1 for providing a first initial voltage Vi1, and configured to provide the first initial voltage Vi1 to the third node N3 under the control of a resetting control signal from the resetting control line R0.

In the pixel circuitry as shown in FIG. 1 in at least one embodiment of the present disclosure, the connection node may be the third node N3.

In the pixel circuitry as shown in FIG. 1 in at least one embodiment of the present disclosure, the resetting control line may be the light-emission control line, or the resetting control signal from the resetting control line and the light-emission control signal from the light-emission control line may be one same control signal. However, the present disclosure is not limited thereto.

During the operation of the pixel circuitry in FIG. 1 in at least one embodiment of the present disclosure, a display period includes a light-emitting stage and a non-light-emitting stage. At the non-light-emitting stage, the resetting control circuitry 20 applies the first initial voltage Vi1 to the third node N3 under the control of the resetting control signal, so as to reset a potential at the third node N3, thereby to enable the reset potential at the third node N3 to cancel out the superfluous electric charges accumulated at the first node N1 when the pixel circuitry enters the light-emitting stage again. In this way, it is able to inhibit such a phenomenon that the brightness values increase gradually within one display period (the display period may be the period for displaying one frame), thereby to suppress the occurrence of flicker.

Figure 2:
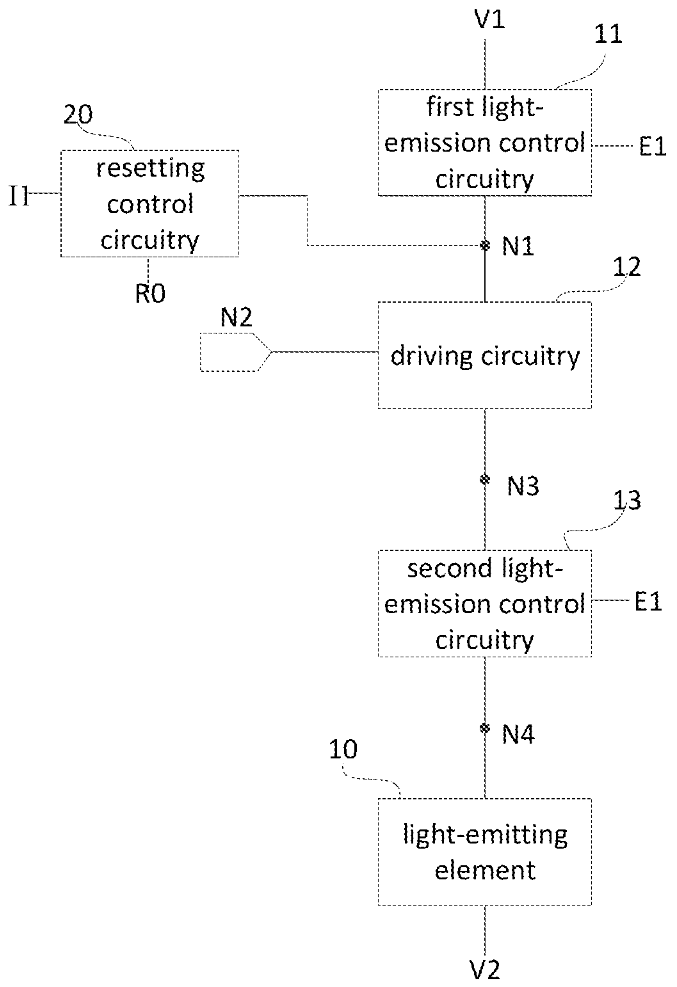
FIG. 2 is another schematic view showing the pixel circuitry according to at least one embodiment of the present disclosure.

As shown in FIG. 2, in at least one embodiment of the present disclosure, the pixel circuitry includes a first light-emission control circuitry 11, a driving circuitry 12, a second light-emission control circuitry 13, a resetting control circuitry 20 and a light-emitting element 10. The first light-emission control circuitry 11 is electrically connected to a light-emission control line E1, a first voltage end V1 and a first node N1, and configured to control the first voltage end V1 to be electrically connected to the first node N1 under the control of a light-emission control signal from the light-emission control line E1. The first voltage end V1 is configured to provide a first voltage signal. A control end of the driving circuitry 12 is electrically connected to a second node N2, and the driving circuitry is configured to generate a driving current for driving the light-emitting element 10 under the control of a potential at the control end. The second light-emission control circuitry 13 is electrically connected to the light-emission control line E1, a third node N3 and a fourth node N4, and configured to control the third node N3 to be electrically connected to the fourth node N4 under the control of the light-emission control signal. A first electrode of the light-emitting element 10 is electrically connected to the fourth node N4, and a second electrode of the light-emitting element 10 is electrically connected to a second voltage end V2. The resetting control circuitry 20 is electrically connected to a resetting control line R0, the first node N1 and a first initial voltage end I1 for providing a first initial voltage Vi1, and configured to provide the first initial voltage Vi1 to the first node N1 under the control of a resetting control signal from the resetting control line R0.

In the pixel circuitry as shown in FIG. 2 in at least one embodiment of the present disclosure, the connection node is the first node N1.

In the pixel circuitry as shown in FIG. 2 in at least one embodiment of the present disclosure, the resetting control line is the light-emission control line, or the resetting control signal from the resetting control line and the light-emission control signal from the light-emission control line are one same control signal. However, the present disclosure is not limited thereto.

During the operation of the pixel circuitry in FIG. 2, a display period includes a light-emitting stage and a non-light-emitting stage. At the non-light-emitting stage, the resetting control circuitry 20 applies the first initial voltage Vi1 to the first node N1 under the control of the resetting control signal, so as to enable the reset low potential at the third node N3 to cancel out the superfluous electric charges accumulated at the first node N1 when the pixel circuitry enters the light-emitting stage again. In this way, it is able to inhibit such a phenomenon that the brightness values increase gradually within one display period (the display period may be the period for displaying one frame), thereby to suppress the occurrence of flicker.

Figure 3:
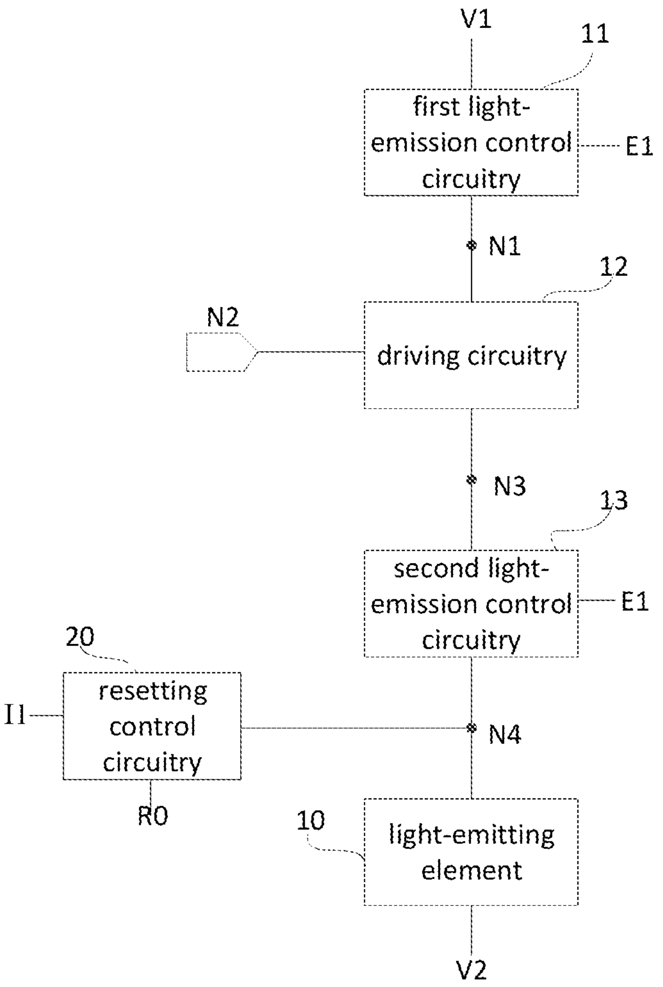
FIG. 3 is yet another schematic view showing the pixel circuitry according to at least one embodiment of the present disclosure.

As shown in FIG. 3, the pixel circuitry in the embodiments of the present disclosure includes a first light-emission control circuitry 11, a driving circuitry 12, a second light-emission control circuitry 13, a resetting control circuitry 20 and a light-emitting element 10. The first light-emission control circuitry 11 is electrically connected to a light-emission control line E1, a first voltage end V1 and a first node N1, and configured to control the first voltage end V1 to be electrically connected to the first node N1 under the control of a light-emission control signal from the light-emission control line E1. The first voltage end V1 is configured to provide a first voltage signal. A control end of the driving circuitry 12 is electrically connected to a second node N2, and the driving circuitry is configured to generate a driving current for driving the light-emitting element 10 under the control of a potential at the control end. The second light-emission control circuitry 13 is electrically connected to the light-emission control line E1, a third node N3 and a fourth node N4, and configured to control the third node N3 to be electrically connected to the fourth node N4 under the control of the light-emission control signal. A first electrode of the light-emitting element 10 is electrically connected to the fourth node N4, and a second electrode of the light-emitting element 10 is electrically connected to a second voltage end V2. The resetting control circuitry 20 is electrically connected to a resetting control line R0, the fourth node N4 and a first initial voltage end I1 for providing a first initial voltage Vi1, and configured to provide the first initial voltage Vi1 to the fourth node N4 under the control of a resetting control signal from the resetting control line R0.

In the pixel circuitry as shown in FIG. 3 in at least one embodiment of the present disclosure, the connection node is the fourth node N4.

In the pixel circuitry as shown in FIG. 3 in at least one embodiment of the present disclosure, the resetting control line is the light-emission control line, or the resetting control signal from the resetting control line and the light-emission control signal from the light-emission control line are one same control signal. However, the present disclosure is not limited thereto.

During the operation of the pixel circuitry in FIG. 3, a display period includes a light-emitting stage and a non-light-emitting stage. At the non-light-emitting stage, the resetting control circuitry 20 applies the first initial voltage Vi1 to the fourth node N4 under the control of the resetting control signal, so as to enable the reset low potential at the fourth node N4 to cancel out the superfluous electric charges accumulated at the first node N1 when the pixel circuitry enters the light-emitting stage again. In this way, it is able to inhibit such a phenomenon that the brightness values increase gradually within one display period (the display period may be the period for displaying one frame), thereby to suppress the occurrence of flicker.

In a possible embodiment of the present disclosure, the resetting control circuitry includes a first control circuitry, a second control circuitry and a first energy storage circuitry. The first control circuitry is electrically connected to the resetting control line, the connection node and the fifth node, and configured to control the connection node to be electrically connected to or electrically disconnected from the fifth node under the control of the resetting control signal. The second control circuitry is electrically connected to the resetting control line, the fifth node and the first initial voltage end, and configured to write the first initial voltage from the first initial voltage end into the fifth node under the control of the resetting control signal. The first energy storage circuitry is electrically connected to the fifth node, and configured to store electric energy.

In at least one embodiment of the present disclosure, the resetting control circuitry includes a first control circuitry, a second control circuitry and a first energy storage circuitry. At the light-emitting stage, the second control circuitry writes the first initial voltage into the fifth node under the control of the resetting control signal, and the first energy storage circuitry stores the first initial voltage at the fifth node N5. At the non-light-emitting stage, the first control circuitry controls the fifth node to be electrically connected to the third node under the control of the resetting control signal, to write the first initial voltage into the connection node.

Figure 4:
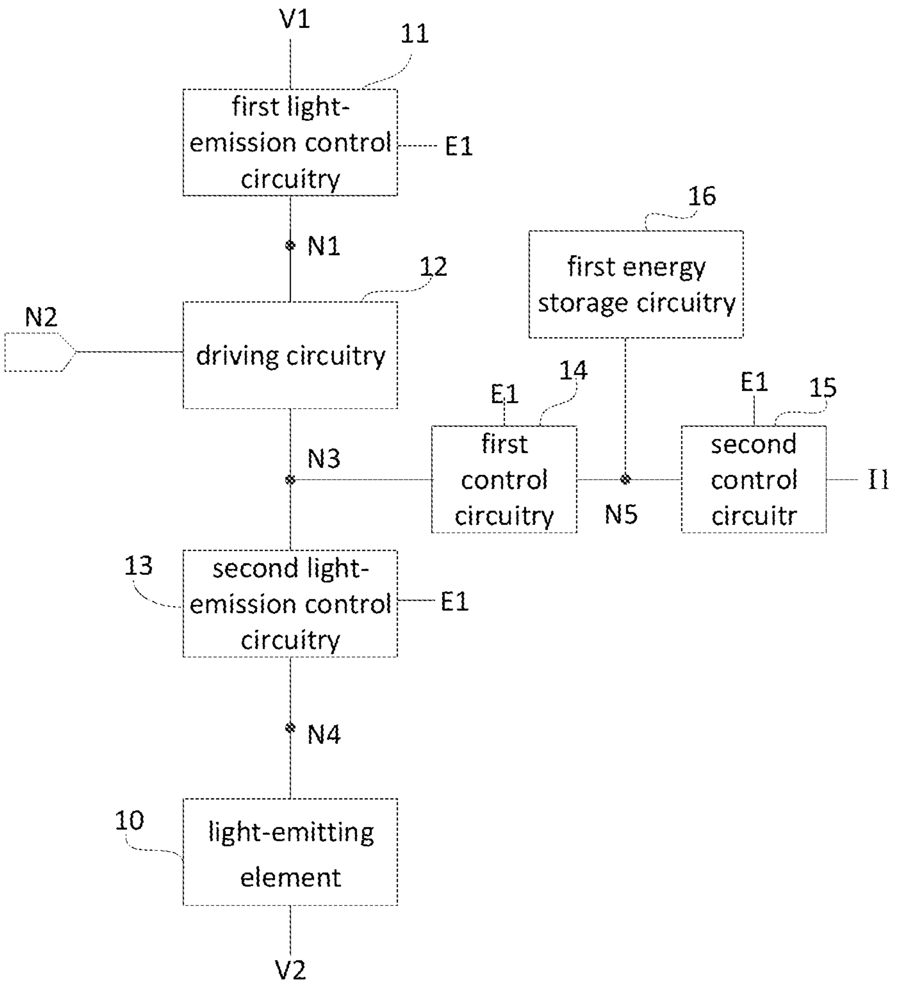
FIG. 4 is still yet another schematic view showing the pixel circuitry according to at least one embodiment of the present disclosure.

As shown in FIG. 4, the pixel circuitry in the embodiments of the present disclosure includes a first light-emission control circuitry 11, a driving circuitry 12, a second light-emission control circuitry 13, a resetting control circuitry and a light-emitting element 10. The resetting control circuitry includes a first control circuitry 14, a second control circuitry 15 and a first energy storage circuitry 16. The first light-emission control circuitry 11 is electrically connected to a light-emission control line E1, a first voltage end V1 and a first node N1, and configured to control the first voltage end V1 to be electrically connected to the first node N1 under the control of a light-emission control signal from the light-emission control line E1. The first voltage end V1 is configured to provide a first voltage signal. A control end of the driving circuitry 12 is electrically connected to a second node N2, and the driving circuitry is configured to generate a driving current for driving the light-emitting element 10 under the control of a potential at the control end. The second light-emission control circuitry 13 is electrically connected to the light-emission control line E1, the third node N3 and a fourth node N4, and configured to control the third node N3 to be electrically connected to the fourth node N4 under the control of the light-emission control signal. A first electrode of the light-emitting element 10 is electrically connected to the fourth node N4, and a second electrode of the light-emitting element 10 is electrically connected to a second voltage end V2. The first control circuitry 14 is electrically connected to the light-emission control line E1, the third node N3 and the fifth node N5, and configured to control the third node N3 to be electrically connected to or electrically disconnected from the fifth node N5 under the control of the light-emission control signal. The second control circuitry 15 is electrically connected to the light-emission control line E1, the fifth node N5 and the first initial voltage end I1, and configured to write the first initial voltage Vi1 from the first initial voltage end I1 into the fifth node N5 under the control of the light-emission control signal. The first energy storage circuitry 16 is electrically connected to the fifth node N5, and configured to store electric energy.

In at least one embodiment of FIG. 4, the connection node is the third node N3, and the resetting control line is the light-emission control line E1.

During the operation of the pixel circuitry as shown in FIG. 4, at the light-emitting stage, the second control circuitry 15 writes the first initial voltage Vi1 into the fifth node N5 under the control of the light-emission control signal, and the first energy storage circuitry 16 stores the first initial voltage Vi1 at the fifth node N5. At the non-light-emitting stage, the potential at the third node N3 is reset by the first control circuitry 14 through Vi1 stored at the fifth node N5, so as to enable the reset low potential at the third node N3 to cancel out the superfluous electric charges accumulated at the first node N1 when the pixel circuitry enters the light-emitting stage again. In this way, it is able to inhibit such a phenomenon that the brightness values increase gradually within one display period (the display period may be the period for displaying one frame), thereby to suppress the occurrence of flicker.

Figure 5:
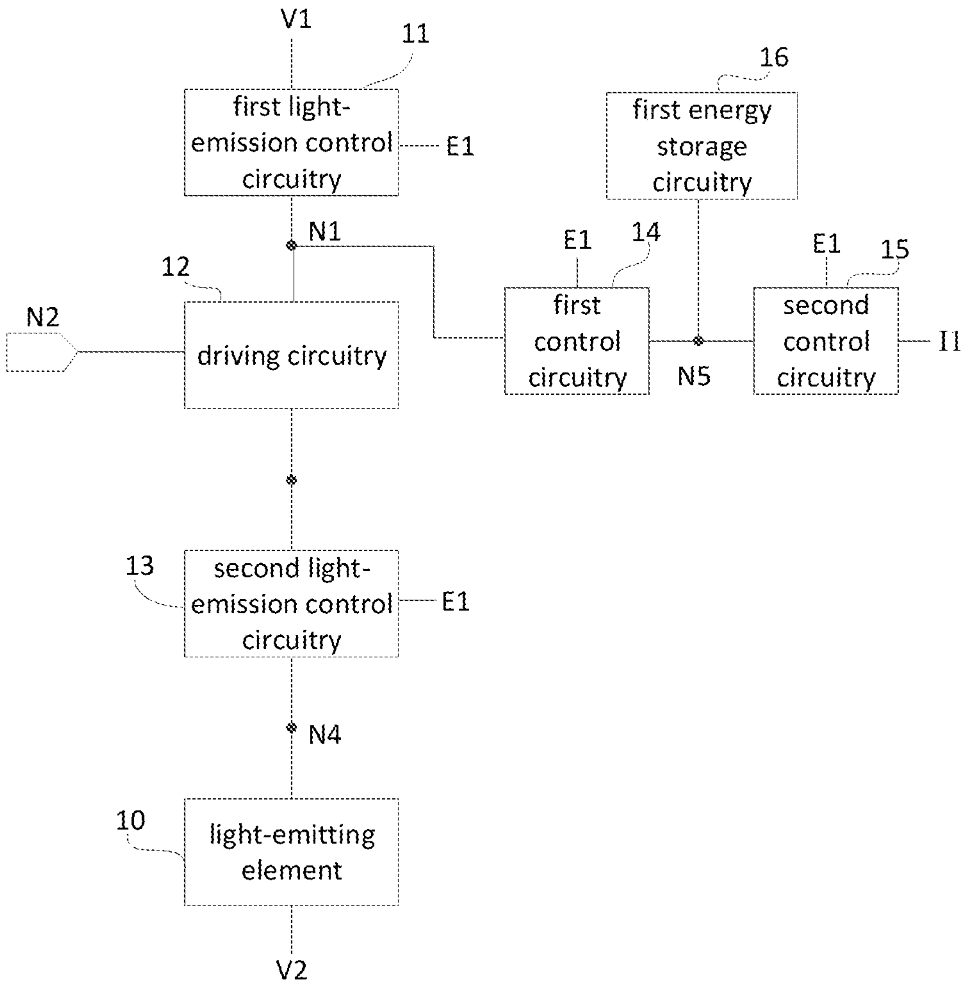
FIG. 5 is still yet another schematic view showing the pixel circuitry according to at least one embodiment of the present disclosure.

As shown in FIG. 5, the pixel circuitry in the embodiments of the present disclosure includes a first light-emission control circuitry 11, a driving circuitry 12, a second light-emission control circuitry 13, a resetting control circuitry and a light-emitting element 10. The resetting control circuitry includes a first control circuitry 14, a second control circuitry 15 and a first energy storage circuitry 16. The first light-emission control circuitry 11 is electrically connected to a light-emission control line E1, a first voltage end V1 and a first node N1, and configured to control the first voltage end V1 to be electrically connected to the first node N1 under the control of a light-emission control signal from the light-emission control line E1. The first voltage end V1 is configured to provide a first voltage signal. A control end of the driving circuitry 12 is electrically connected to a second node N2, and the driving circuitry is configured to generate a driving current for driving the light-emitting element 10 under the control of a potential at the control end. The second light-emission control circuitry 13 is electrically connected to the light-emission control line E1, the third node N3 and a fourth node N4, and configured to control the third node N3 to be electrically connected to o the fourth node N4 under the control of the light-emission control signal. A first electrode of the light-emitting element 10 is electrically connected to the fourth node N4, and a second electrode of the light-emitting element 10 is electrically connected to a second voltage end V2. The first control circuitry 14 is electrically connected to the light-emission control line E1, the first node N1 and the fifth node N5, and configured to control the first node N1 to be electrically connected to the fifth node N5 under the control of the light-emission control signal. The second control circuitry 15 is electrically connected to the light-emission control line E1, the fifth node N5 and the first initial voltage end I1, and configured to write the first initial voltage Vi1 from the first initial voltage end I1 into the fifth node N5 under the control of the light-emission control signal. The first energy storage circuitry 16 is electrically connected to the fifth node N5, and configured to store electric energy.

In at least one embodiment shown in FIG. 5, the connection node is the first node N1, and the resetting control line is the light-emission control line E1.

During the operation of the pixel circuitry as shown in FIG. 5, a display period includes a non-light-emitting stage and a light-emitting stage. At the light-emitting stage, the second control circuitry 15 writes the first initial voltage Vi1 into the fifth node N5 under the control of the light-emission control signal, and the first energy storage circuitry 16 stores the first initial voltage Vi1 at the fifth node N5. At the non-light-emitting stage, the potential at the first node N1 is reset by the first control circuitry 14 through Vi1 stored at the fifth node N5, so as to enable the reset low potential to cancel out the superfluous electric charges accumulated at the first node N1 when the pixel circuitry enters the light-emitting stage again. In this way, it is able to inhibit such a phenomenon that the brightness values increase gradually within one display period (the display period may be the period for displaying one frame), thereby to suppress the occurrence of flicker.

Figure 6:
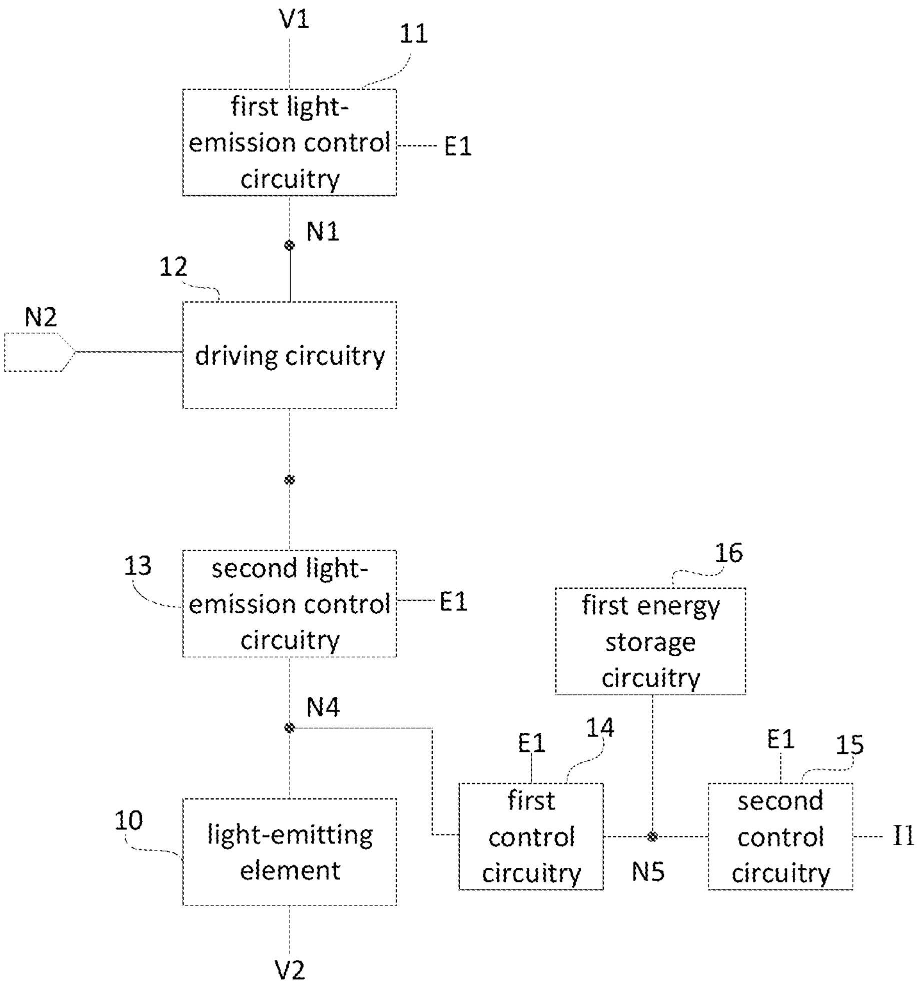
FIG. 6 is still yet another schematic view showing the pixel circuitry according to at least one embodiment of the present disclosure.

As shown in FIG. 6, the pixel circuitry in the embodiments of the present disclosure includes a first light-emission control circuitry 11, a driving circuitry 12, a second light-emission control circuitry 13, a resetting control circuitry and a light-emitting element 10. The resetting control circuitry includes a first control circuitry 14, a second control circuitry 15 and a first energy storage circuitry 16. The first light-emission control circuitry 11 is electrically connected to a light-emission control line E1, a first voltage end V1 and a first node N1, and configured to control the first voltage end V1 to be electrically connected to the first node N1 under the control of a light-emission control signal from the light-emission control line E1. The first voltage end V1 is configured to provide a first voltage signal. A control end of the driving circuitry 12 is electrically connected to a second node N2, and the driving circuitry is configured to generate a driving current for driving the light-emitting element 10 under the control of a potential at the control end. The second light-emission control circuitry 13 is electrically connected to the light-emission control line E1, the third node N3 and a fourth node N4, and configured to control the third node N3 to be electrically connected to the fourth node N4 under the control of the light-emission control signal. A first electrode of the light-emitting element 10 is electrically connected to the fourth node N4, and a second electrode of the light-emitting element 10 is electrically connected to a second voltage end V2. The first control circuitry 14 is electrically connected to the light-emission control line E1, the fourth node N4 and the fifth node N5, and configured to control the fourth node N4 to be electrically connected to the fifth node N5 under the control of the light-emission control signal. The second control circuitry 15 is electrically connected to the light-emission control line E1, the fifth node N5 and the first initial voltage end I1, and configured to write the first initial voltage Vi1 from the first initial voltage end I1 into the fifth node N5 under the control of the light-emission control signal. The first energy storage circuitry 16 is electrically connected to the fifth node N5, and configured to store electric energy.

In at least one embodiment shown in FIG. 6, the connection node is the fourth node N4, and the resetting control line is the light-emission control line E1.

During the operation of the pixel circuitry as shown in FIG. 6, a display period includes a non-light-emitting stage and a light-emitting stage. At the light-emitting stage, the second control circuitry 15 writes the first initial voltage Vi1 into the fifth node N5 under the control of the light-emission control signal, and the first energy storage circuitry 16 stores the first initial voltage Vi1 at the fifth node N5. At the non-light-emitting stage, the potential at the fourth node N4 is reset by the first control circuitry 14 through Vi1 stored at the fifth node N5, so as to enable the reset low potential at the fourth node N4 to cancel out the superfluous electric charges accumulated at the first node N1 when the pixel circuitry enters the light-emitting stage again. In this way, it is able to inhibit such a phenomenon that the brightness values increase gradually within one display period (the display period may be the period for displaying one frame), thereby to suppress the occurrence of flicker.

Optionally, the first control circuitry includes a first transistor and the second control circuitry includes a second transistor. A control electrode of the first transistor is electrically connected to the resetting control line, a first electrode of the first transistor is electrically connected to the fifth node, and a second electrode of the first transistor is electrically connected to the third node. A control electrode of the second transistor is electrically connected to the resetting control line, a first electrode of the second transistor is electrically connected to the first initial voltage end, and a second electrode of the second transistor is electrically connected to the fifth node.

Optionally, the first transistor is an oxide thin film transistor, and the second transistor is a low temperature polysilicon thin film transistor.

In at least one embodiment of the present disclosure, the first energy storage circuitry includes a first capacitor, a first end of which is electrically connected to the fifth node, and a second end of which is electrically connected to the first voltage end.

In at least one embodiment of the present disclosure, the pixel circuitry further includes a data write-in circuitry, a compensation control circuitry, a first initialization circuitry, a second energy storage circuitry and a second initialization circuitry. The data write-in circuitry is electrically connected to a write-in control line, a data line and the first node, and configured to write a data voltage from the data line into the first node under the control of a write-in control signal from the write-in control line. The compensation control circuitry is electrically connected to a compensation control line, the control end of the driving circuitry and the second end of the driving circuitry, and configured to control the control end of the driving circuitry to be electrically connected to or electrically disconnected from the second end of the driving circuitry under the control of a compensation control signal from the compensation control line. The first initialization circuitry is electrically connected to an initialization control line, a second initial voltage end and the control end of the driving circuitry, and configured to write a second initial voltage from the second initial voltage end into the control end of the driving circuitry under the control of an initialization control signal from the initialization control line, so that the driving circuitry controls the first end of the driving circuitry to be electrically connected to the second end of the driving circuitry under the potential at the control end at the beginning of the compensation stage. The second energy storage circuitry is electrically connected to the control end of the driving circuitry, and configured to store electric energy. The second initialization circuitry is electrically connected to the write-in control line, a third initial voltage end and the fourth node, and configured to write a third initial voltage from the third initial voltage end into the fourth node under the control of the write-in control signal, so as to control the light-emitting element not to emit light.

In at least one embodiment of the present disclosure, the pixel circuitry further includes a data write-in circuitry 41, a compensation control circuitry, a first initialization circuitry, a second energy storage circuitry and a second initialization circuitry. The data write-in circuitry is configured to write the data voltage into the node. The compensation control circuitry is configured to compensate for a threshold voltage. The first initialization circuitry is configured to reset the potential at the control end of the driving circuitry, so that the driving circuitry controls the first end of the driving circuitry to be electrically connected to the second end of the driving circuitry under the control of the potential at the control end at the beginning of the compensation stage. The second energy storage circuitry is configured to maintain the potential at the control end of the driving circuitry. The second initialization circuitry is configured to reset a potential at the first electrode of the light-emitting element, so as to control the light-emitting element not to emit light.

In at least one embodiment of the present disclosure, during the operation of the pixel circuitry, when an image is to be displayed at a low frequency, a display frame includes a refresh display sub-frame and at least one maintenance display sub-frame. Within the maintenance display sub-frame, the data line provides a first voltage signal. At the data write-in stage within the maintenance display sub-frame, the data write-in circuitry writes the first voltage signal into the first node under the control of the write-in control signal.

Within the maintenance display sub-frame, even when a current leakage occurs for a transistor of the data write-in circuitry, the potential at the first node is also maintained as a first voltage value (the first voltage value is a value of the first voltage signal), so as to maintain the potential at the first node as approximately a same value when an image is displayed at different frequencies, thereby to reduce a difference in the brightness values.

In at least one embodiment of the present disclosure, the first voltage signal is a high voltage signal, and the first voltage value is greater than or equal to 2.5V and smaller than or equal to 7V. For example, the first voltage value may be, but not limited to, 2.5V, 3V, 4V, 4.6V, 5V, 5.5V, 6.4V or 7V.

In the related art, when an image is displayed by the pixel circuitry at a low frequency, a display frame includes a refresh display sub-frame and at least one maintenance display sub-frame. Within the refresh display sub-frame, the data voltage is written into the pixel circuitry to enable the light-emitting element to emit light, and the maintenance display sub-frame is at least used to prolong a light-emission time period and achieve a low frequency. Within the maintenance display sub-frame, the data line provides a direct-current voltage signal, and for example, the direct-current voltage signal is 6.4V. Within the maintenance display sub-frame, the direct-current voltage signal may leak into the first node through a transistor of the data write-in circuitry, so that the potential at the first node increases. When the pixel circuitry enters the light-emitting stage again, a driving current for driving a transistor of the driving circuitry increases, and thereby the brightness value increases. Based on the above, in at least one of the present disclosure, within the maintenance display sub-frame, the data line provides the first voltage signal, so as to reduce the difference in the brightness values at different frequencies for displaying.

In at least one embodiment of the present disclosure, when an image is displayed by the pixel circuitry at a low frequency, the data line is controlled to provide the first voltage signal within a time period of the refresh display sub-frame other than the data write-in stage. When an image is displayed normally by the pixel circuitry (i.e., a display frequency of the pixel circuitry is relatively high), the data line is controlled to provide the first voltage signal within a time period of the display frame other than the data write-in stage.

Figure 7:
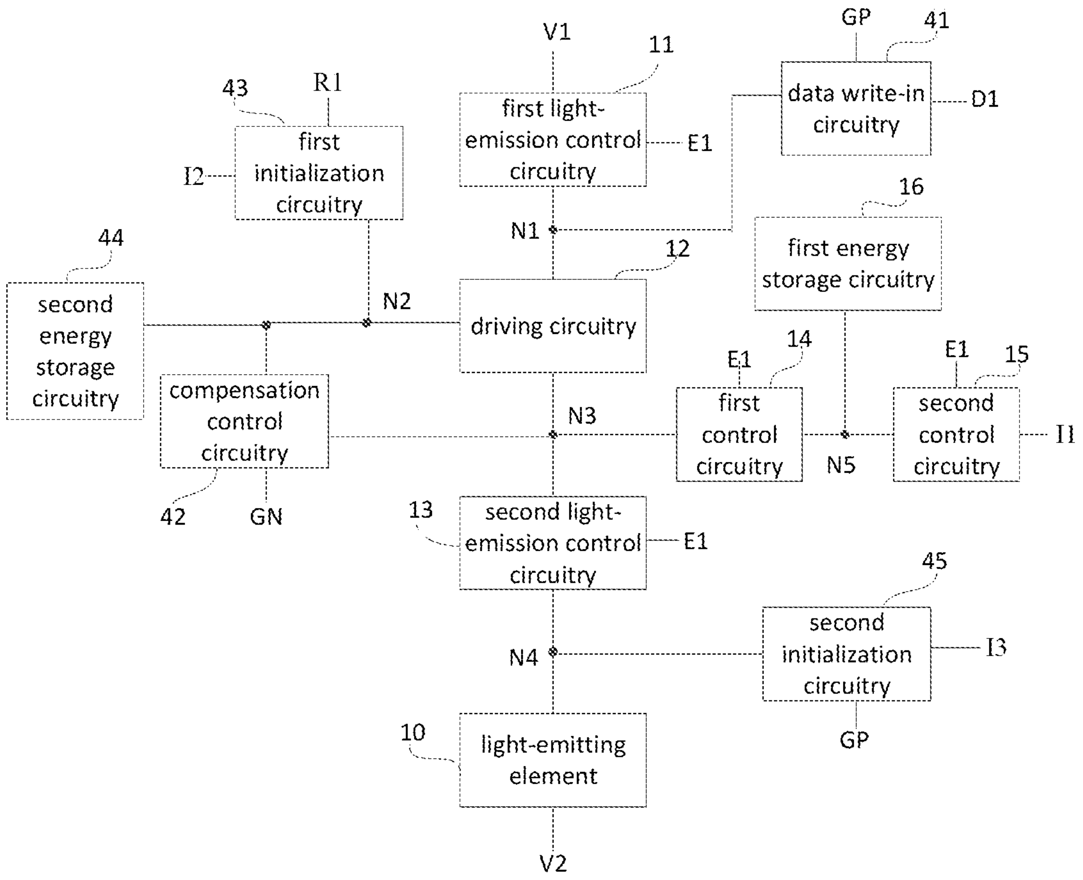
FIG. 7 is still yet another schematic view showing the pixel circuitry according to at least one embodiment of the present disclosure.

As shown in FIG. 7, based on the pixel circuitry in FIG. 4 in at least one embodiment of the present disclosure, the pixel circuitry further includes a data write-in circuitry 41, a compensation control circuitry 42, a first initialization circuitry 43, a second energy storage circuitry 44 and a second initialization circuitry 45. The data write-in circuitry 41 is electrically connected to a write-in control line GP, a data line D1 and the first node N1, and configured to write a data voltage from the data line D1 into the first node N1 under the control of a write-in control signal from the write-in control line GP. The compensation control circuitry 42 is electrically connected to a compensation control line GN, the control end of the driving circuitry 12 and the second end of the driving circuitry 12, and configured to control the control end of the driving circuitry 12 to be electrically connected to the second end of the driving circuitry 12 under the control of a compensation control signal from the compensation control line GN. The first initialization circuitry 43 is electrically connected to an initialization control line R1, a second initial voltage end I2 and the control end of the driving circuitry 12, and configured to write a second initial voltage Vi2 from the second initial voltage end I2 into the control end of the driving circuitry 12 under the control of an initialization control signal from the initialization control line R1. The second energy storage circuitry 44 is electrically connected to the control end of the driving circuitry 12, and configured to store electric energy. The second initialization circuitry 45 is electrically connected to the write-in control line GP, a third initial voltage end I3 and the fourth node N4, and configured to write a third initial voltage from the third initial voltage end I3 into the fourth node N4 under the control of the write-in control signal.

Optionally, the second initial voltage Vi2 may be, but not limited to, greater than or equal to −5V and smaller than or equal to −3V.

In at least one embodiment of the present disclosure, the third initial voltage end I3 may be, but not limited to, a same initial voltage end as the first initial voltage end I1. In actual use, the third initial voltage end I3 may be different from the first initial voltage end I1.

Figure 8:
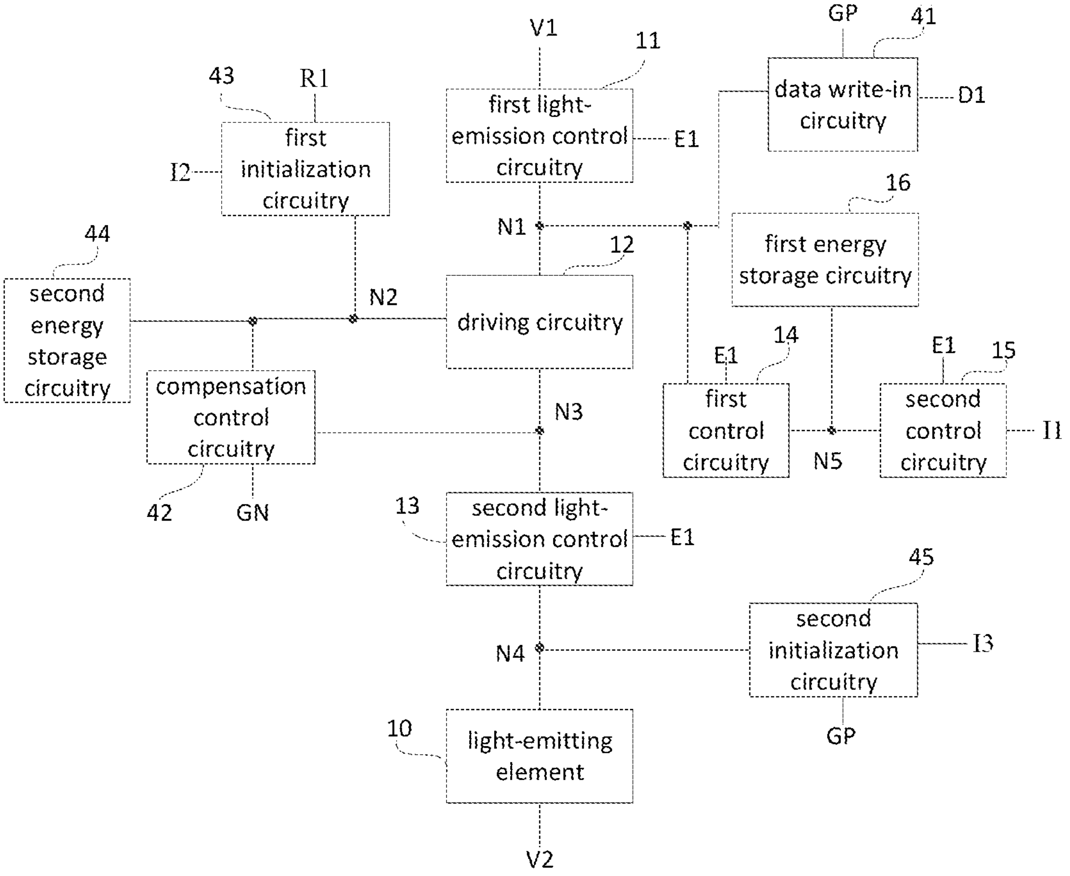
FIG. 8 is still yet another schematic view showing the pixel circuitry according to at least one embodiment of the present disclosure.

As shown in FIG. 8, based on the pixel circuitry in FIG. 5 in at least one embodiment of the present disclosure, the pixel circuitry further includes a data write-in circuitry 41, a compensation control circuitry 42, a first initialization circuitry 43, a second energy storage circuitry 44 and a second initialization circuitry 45. The data write-in circuitry 41 is electrically connected to a write-in control line GP, a data line D1 and the first node N1, and configured to write a data voltage from the data line D1 into the first node N1 under the control of a write-in control signal from the write-in control line GP. The compensation control circuitry 42 is electrically connected to a compensation control line GN, the control end of the driving circuitry 12 and the second end of the driving circuitry 12, and configured to control the control end of the driving circuitry 12 to be electrically connected to or electrically disconnected from the second end of the driving circuitry 12 under the control of a compensation control signal from the compensation control line GN. The first initialization circuitry 43 is electrically connected to an initialization control line R1, a second initial voltage end I2 and the control end of the driving circuitry 12, and configured to write a second initial voltage Vi2 from the second initial voltage end I2 into the control end of the driving circuitry 12 under the control of an initialization control signal from the initialization control line R1. The second energy storage circuitry 44 is electrically connected to the control end of the driving circuitry 12, and configured to store electric energy. The second initialization circuitry 45 is electrically connected to the write-in control line GP, a third initial voltage end I3 and the fourth node N4, and configured to write a third initial voltage from the third initial voltage end I3 into the fourth node N4 under the control of the write-in control signal.

Figure 9:
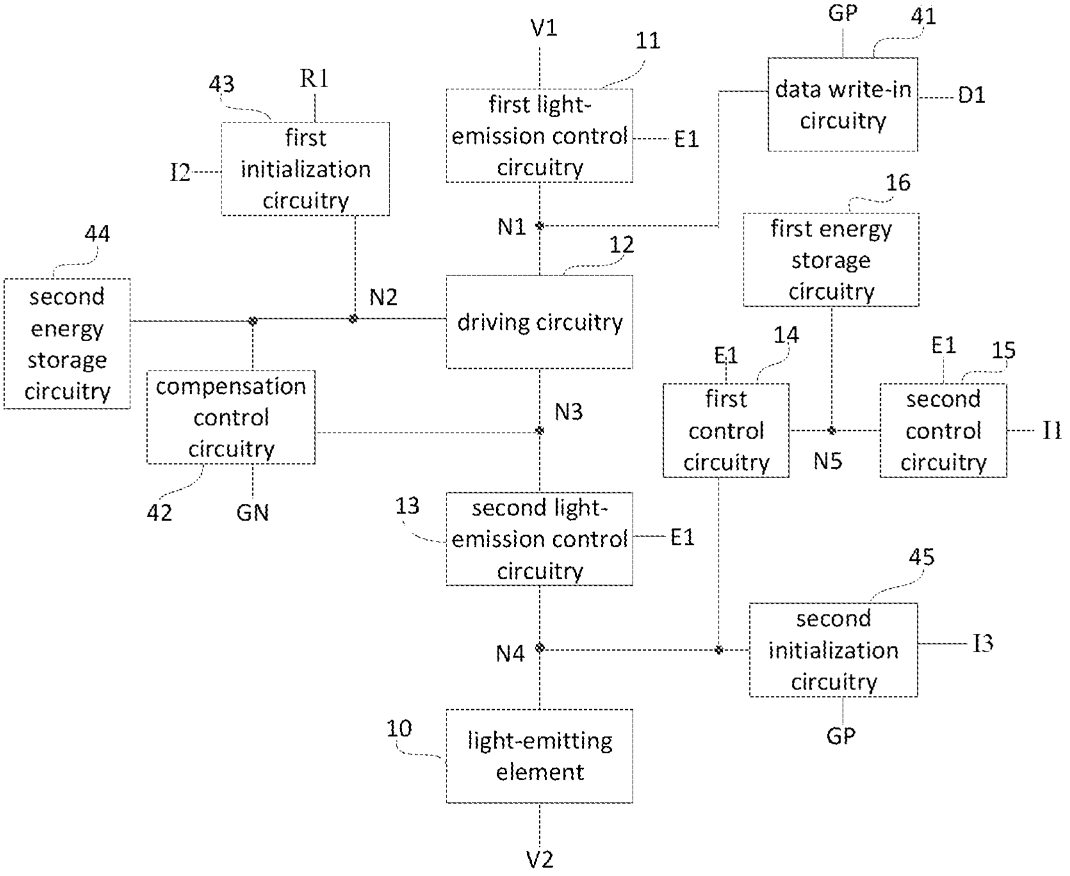
FIG. 9 is still yet another schematic view showing the pixel circuitry according to at least one embodiment of the present disclosure.

As shown in FIG. 9, based on the pixel circuitry in FIG. 6 in at least one embodiment of the present disclosure, the pixel circuitry further includes a data write-in circuitry 41, a compensation control circuitry 42, a first initialization circuitry 43, a second energy storage circuitry 44 and a second initialization circuitry 45. The data write-in circuitry 41 is electrically connected to a write-in control line GP, a data line D1 and the first node N1, and configured to write a data voltage from the data line D1 into the first node N1 under the control of a write-in control signal from the write-in control line GP. The compensation control circuitry 42 is electrically connected to a compensation control line GN, the control end of the driving circuitry 12 and the second end of the driving circuitry 12, and configured to control the control end of the driving circuitry 12 to be electrically connected to or electrically disconnected from the second end of the driving circuitry 12 under the control of a compensation control signal from the compensation control line GN. The first initialization circuitry 43 is electrically connected to an initialization control line R1, a second initial voltage end I2 and the control end of the driving circuitry 12, and configured to write a second initial voltage Vi2 from the second initial voltage end I2 into the control end of the driving circuitry 12 under the control of an initialization control signal from the initialization control line R1. The second energy storage circuitry 44 is electrically connected to the control end of the driving circuitry 12, and configured to store electric energy. The second initialization circuitry 45 is electrically connected to the write-in control line GP, a third initial voltage end I3 and the fourth node N4, and configured to write a third initial voltage from the third initial voltage end I3 into the fourth node N4 under the control of the write-in control signal.

Optionally, the first light-emission control circuitry includes a third transistor, the second light-emission control circuitry includes a fourth transistor, and the driving circuitry includes a driving transistor. A control electrode of the third transistor is electrically connected to the light-emission control line, a first electrode of the third transistor is electrically connected to the first voltage end, and a second electrode of the third transistor is electrically connected to the first node. A control electrode of the fourth transistor is electrically connected to the light-emission control line, a first electrode of the fourth transistor is electrically connected to the third node, and a second electrode of the fourth transistor is electrically connected to the fourth node. A control electrode of the driving transistor is electrically connected to the second node, a first electrode of the driving transistor is electrically connected to the first node, and a second electrode of the driving transistor is electrically connected to the third node.

Optionally, the data write-in circuitry includes a fifth transistor, the compensation control circuitry includes a sixth transistor, the first initialization circuitry includes a seventh transistor, the second initialization circuitry includes an eighth transistor, and the second energy storage circuitry includes a second capacitor. A control electrode of the fifth transistor is electrically connected to the write-in control line, a first electrode of the fifth transistor is electrically connected to the data line, and a second electrode of the fifth transistor is electrically connected to the first end of the driving circuitry. A control electrode of the sixth transistor is electrically connected to the compensation control line, a first electrode of the sixth transistor is electrically connected to the control end of the driving circuitry, and a second electrode of the sixth transistor is electrically connected to the second end of the driving circuitry. A control electrode of the seventh transistor is electrically connected to the initialization control line, a first electrode of the seventh transistor is electrically connected to the second initial voltage end, and a second electrode of the seventh transistor is electrically connected to the control end of the driving circuitry. A control electrode of the eighth transistor is electrically connected to the write-in control line, a first electrode of the eighth transistor is electrically connected to the third initial voltage end, and a second electrode of the eighth transistor is electrically connected to the fourth node. A first end of the second capacitor is electrically connected to the second node, and a second end of the second capacitor is electrically connected to the first voltage end.

Figure 10:
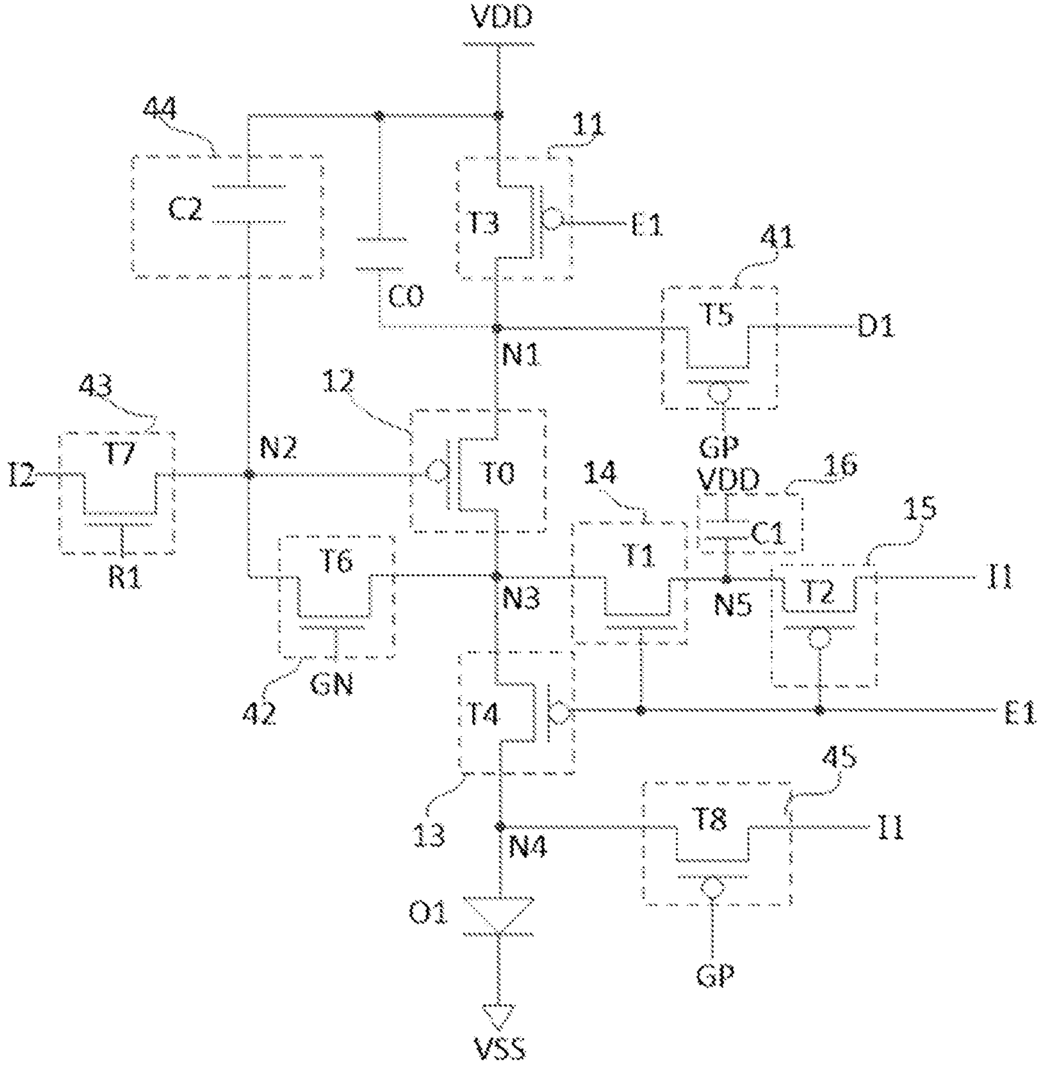
FIG. 10 is still yet another schematic view showing the pixel circuitry according to at least one embodiment of the present disclosure.

As shown in FIG. 10, based on the pixel circuitry in FIG. 7 in at least one embodiment of the present disclosure, the light-emitting element is an organic light-emitting diode O1, the first control circuitry 14 includes a first transistor T1, and the second control circuitry 15 includes a second transistor T2. A gate electrode of the first transistor T1 is electrically connected to the light-emission control line E1, a source electrode of the first transistor T1 is electrically connected to the fifth node N5, and a drain electrode of the first transistor T1 is electrically connected to the third node N3. A gate electrode of the second transistor T2 is electrically connected to the light-emission control line E1, a source electrode of the second transistor T2 is electrically connected to the first initial voltage end I1, and a drain electrode of the second transistor T2 is electrically connected to the fifth node N5. The first initial voltage end I1 is configured to provide the first initial voltage Vi1. The first energy storage circuitry 16 includes a first capacitor C1, a first end of which is electrically connected to the fifth node N5, and a second end of which is electrically connected to a high voltage end VDD. The first light-emission control circuitry 11 includes a third transistor T3, the second light-emission control circuitry 13 includes a fourth transistor T4, and the driving circuitry 12 includes a driving transistor T0. A gate electrode of the third transistor T3 is electrically connected to the light-emission control line E1, a source electrode of the third transistor T3 is electrically connected to the high voltage end VDD, and a drain electrode of the third transistor T3 is electrically connected to the first node N1. A gate electrode of the fourth transistor T4 is electrically connected to the light-emission control line E1, a source electrode of the fourth transistor T4 is electrically connected to the third node N3, and a drain electrode of the fourth transistor T4 is electrically connected to the fourth node N4. An anode of the organic light-emitting diode O1 is electrically connected to the fourth node N4, and a cathode of the organic light-emitting diode O1 is electrically connected to a low voltage end VSS. A gate electrode of the driving transistor T0 is electrically connected to the second node N2, a source electrode of the driving transistor T0 is electrically connected to the first node N1, and a drain electrode of the driving transistor T0 is electrically connected to the third node N3. The data write-in circuitry 41 includes a fifth transistor T5, the compensation control circuitry 42 includes a sixth transistor T6, the first initialization circuitry 43 includes a seventh transistor T7, the second initialization circuitry 45 includes an eighth transistor T8, and the second energy storage circuitry 44 includes a second capacitor C2. A gate electrode of the fifth transistor T5 is electrically connected to the write-in control line GP, a source electrode of the fifth transistor T5 is electrically connected to the data line D1, and a drain electrode of the fifth transistor T5 is electrically connected to the source electrode of the driving transistor T0. A gate electrode of the sixth transistor T6 is electrically connected to the compensation control line GN, a source electrode of the sixth transistor T6 is electrically connected to the gate electrode of the driving transistor T0, and a drain electrode of the sixth transistor T6 is electrically connected to the drain electrode of the driving transistor T0. A gate electrode of the seventh transistor T7 is electrically connected to the initialization control line R1, a source electrode of the seventh transistor T7 is electrically connected to the second initial voltage end I2, and a drain electrode of the seventh transistor T7 is electrically connected to the gate electrode of the driving transistor T0. The second initial voltage end I2 is configured to provide the second initial voltage Vi2. A gate electrode of the eighth transistor T8 is electrically connected to the write-in control line GP, a source electrode of the eighth transistor T8 is electrically connected to the first initial voltage end I1, and a drain electrode of the eighth transistor T8 is electrically connected to the fourth node N4. A first end of the second capacitor C2 is electrically connected to the second node N2, and a second end of the second capacitor C2 is electrically connected to the high voltage end VDD.

In FIG. 10. C0 represents a parasitic capacitance between the first node N1 and the high voltage end VDD.

In the pixel circuitry as shown in FIG. 10 in at least one embodiment of the present disclosure, the first initial voltage end is a same voltage end as the third initial voltage end, the first voltage end is the high voltage end VDD, and the second voltage end is the low voltage end VSS. However, the present disclosure is not limited thereto.

In the pixel circuitry as shown in FIG. 10 in at least one embodiment of the present disclosure, the resetting control line is the light-emission control line E1.

In the pixel circuitry as shown in FIG. 10 in at least one embodiment of the present disclosure, T1, T6 and T7 are oxide thin film transistors, and T0, T2, T3, T4, T5 and T8 are low temperature poly-silicon thin film transistors. However, the present disclosure is not limited thereto.

Figure 11:
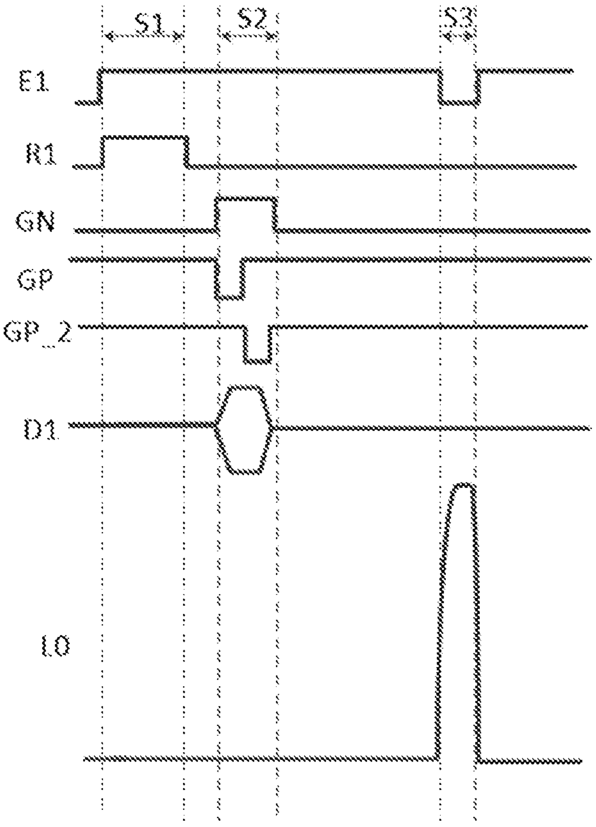
FIG. 11 is a sequence diagram of the pixel circuitry in FIG. 10.

As shown in FIG. 11, during the operation of the pixel circuitry in FIG. 10 in at least one embodiment of the present disclosure, the display period includes an initialization stage S1, a compensation stage S2, a data write-in stage and a light-emitting stage S3. The data write-in stage is arranged in the compensation stage S2, and the initialization stage S1, the compensation stage S2 and the light-emitting stage S3 are arranged sequentially in that order.

At the initialization stage S1, R1 provides a high voltage signal, so as to turn on T7 and apply the second initial voltage Vi2 from the second initial voltage end I2 to the second node N2, thereby to turn on the driving transistor T0 at the beginning of the compensation stage.

Figure 12:
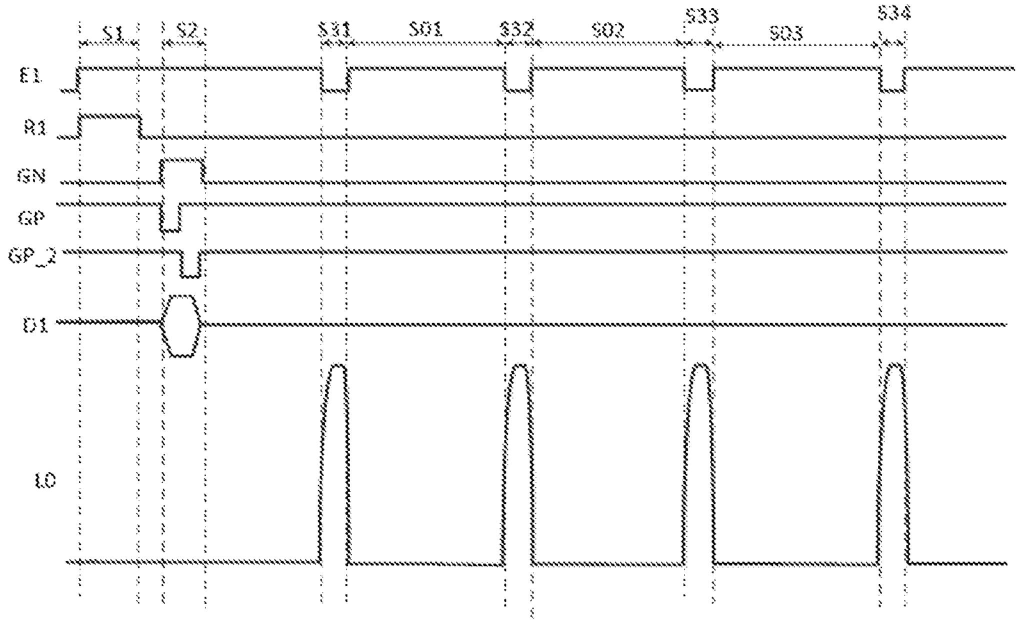
FIG. 12 is another sequence diagram of the pixel circuitry in FIG. 10.

At the initialization stage S1, GN provides a low voltage signal, GP provides a high voltage signal, and E1 provides a high voltage signal, so as to turn on T1, and turn off T2, T3, T4, T5, T6 and T0. At the data write-in stage, the data line D1 provides a data voltage Vdata, and GP provides a low voltage signal, so as to turn on T5 to write the data voltage Vdata into the first node N1, and turn on T8 to write the first initial voltage Vi1 into the anode of O1, thereby to enable O1 not to emit light. At the compensation stage S2, GN provides a high voltage signal. E1 provides a high voltage signal, and R1 provides a low voltage signal, so as to turn off T7, turn on T1, and turn on T6 to enable the second node N2 to be electrically connected to the third node N3. At the beginning of the compensation stage S2, T0 is turned on, and C2 is charged by Vdata through T5, T0 and T6, so as to increase a potential at the second node N2 until T0 is turned off. At this time, the potential at the second node N2 is Vdata+Vth, where Vth represents a threshold voltage of T0, and Vth is a negative value. At the light-emitting stage S3, E1 provides a low voltage signal, R1 provides a low voltage signal, GN provides a low voltage signal, and GP provides a high voltage signal, so as to turn on T3 and T4 to drive O1 to emit light through T0, turn on T2 to write the first initial voltage Vi1 from the first initial voltage end I1 into the fifth node N5. In FIGS. 11 and 12, L0 represents luminance of O1.

As shown in FIG. 11, the data write-in stage may be, but not limited to, arranged in the compensation stage S2. In actual use, the data write-in stage may also be a same time period as the compensation stage.

In FIG. 11, GP_2 represents a next write-in control line adjacent to GP, and a waveform corresponding to GP_2 is a waveform of a write-in control signal for a next row provided by the next write-in control line.

As shown in FIG. 11, at a first half of the compensation stage S2, GP provides a low voltage signal, and at a second half of the compensation stage S2, GP_2 provides a low voltage signal, so as to apply corresponding data voltages to the pixel circuitries in adjacent rows in a time-division manner.

During the operation of the pixel circuitry in FIG. 10 in at least one embodiment of the present disclosure, at the light-emitting stage S3, T2 is turned on, to write the first initial voltage Vi1 from the first initial voltage end I1 into the fifth node N5. The first capacitor C1 stores the first initial voltage Vi1 at the fifth node N5. At the non-light-emitting stage (which may be the portion of the display period other than the light-emitting stage), T1 is turned on, so as to control the fifth node N5 to be electrically connected to the third node N3 and write the first initial voltage Vi1 into the third node N3. When the pixel circuitry enters the light-emitting stage again, the superfluous electric charges accumulated at the first node N1 is cancelled out by the low potential at the third node N3. As a result, it is able to inhibit such a phenomenon that the brightness values increase gradually within a same display period (the display period may be the period for displaying one frame), thereby to suppress the occurrence of flicker.

As shown in FIG. 12, during the operation of the pixel circuitry in FIG. 10 in at least one embodiment of the present disclosure, the display period within the refresh display sub-frame may include an initialization stage S1, a compensation stage S2, a data write-in stage, a first light-emitting stage S31, a second light-emitting stage S32, a third light-emitting stage S33 and a fourth light-emitting stage S34 arranged sequentially in that order. The data write-in stage is arranged in the compensation stage S2. The initialization stage S1, the compensation stage S2, the first light-emitting stage S31, the second light-emitting stage S32, the third light-emitting stage S33 and the fourth light-emitting stage S34 are arranged sequentially in that order. A first interval S01 is arranged between the first light-emitting stage S31 and the second light-emitting stage S32, a second interval S02 is arranged between the second light-emitting stage S32 and the third light-emitting stage S33, and a third interval S03 is arranged between the third light-emitting stage S33 and the fourth light-emitting stage S34. At the initialization stage S1, R1 provides a high voltage signal, so as to turn on T7 and apply the second initial voltage Vi2 from the second initial voltage end I2 to the second node N2, thereby to turn on the driving transistor T0 at the beginning of the compensation stage. At the initialization stage S1, GN provides a low voltage signal, GP provides a high voltage signal, and E1 provides a high voltage signal, so as to turn on T1, and turn off T2, T3, T4, T5, T6 and T0. At the data write-in stage, the data line D1 provides a data voltage Vdata, and GP provides a low voltage signal, so as to turn on T5 to write the data voltage Vdata into the first node N1, and turn on T8 to write the first initial voltage Vi1 into the anode of O1, thereby to enable O1 not to emit light. At the compensation stage S2, GN provides a high voltage signal, E1 provides a high voltage signal, and R1 provides a low voltage signal, so as to turn off T7, turn on T1, and turn on T6 to enable the second node N2 to be electrically connected to the third node N3. At the beginning of the compensation stage S2, T0 is turned on, and C2 is charged by Vdata through T5, T0 and T6, so as to increase a potential at the second node N2 until T0 is turned off. At this time, the potential at the second node N2 is Vdata+Vth, where Vth represents a threshold voltage of T0, and Vth is a negative value. At the first light-emitting stage S31, the second light-emitting stage S32, the third light-emitting stage S33 and the fourth light-emitting stage S34, E1 provides a low voltage signal. R1 provides a low voltage signal, GN provides a low voltage signal, and GP provides a high voltage signal, so as to turn on T3 and T4 to enable T0 to drive O1 to emit light, and turn on T2 to write the first initial voltage Vi1 from the first initial voltage end I1 into the fifth node N5. At the first interval S01, the second interval S02 and the third interval S03, E1 provides a high voltage signal, R1 provides a low voltage signal, GN provides a low voltage signal, and GP provides a high voltage signal, so as to turn on T1, thereby to write the first initial voltage Vi1 stored at the fifth node N5 into the third node N3.

As shown in FIG. 12, in at least one embodiment of the present disclosure, when the pixel circuitry is operated in a low-frequency display mode, a frequency of the write-in control signal from the write-in control line GP is smaller than a frequency of the light-emission control signal from the light-emission control line E1, the light-emission control signal is a high-frequency signal, and the write-in control signal, the initialization control signal from the initialization control line R1 and the compensation control signal from the compensation control line GN are all low-frequency signals, so as to reduce the power consumption.

Figure 13:
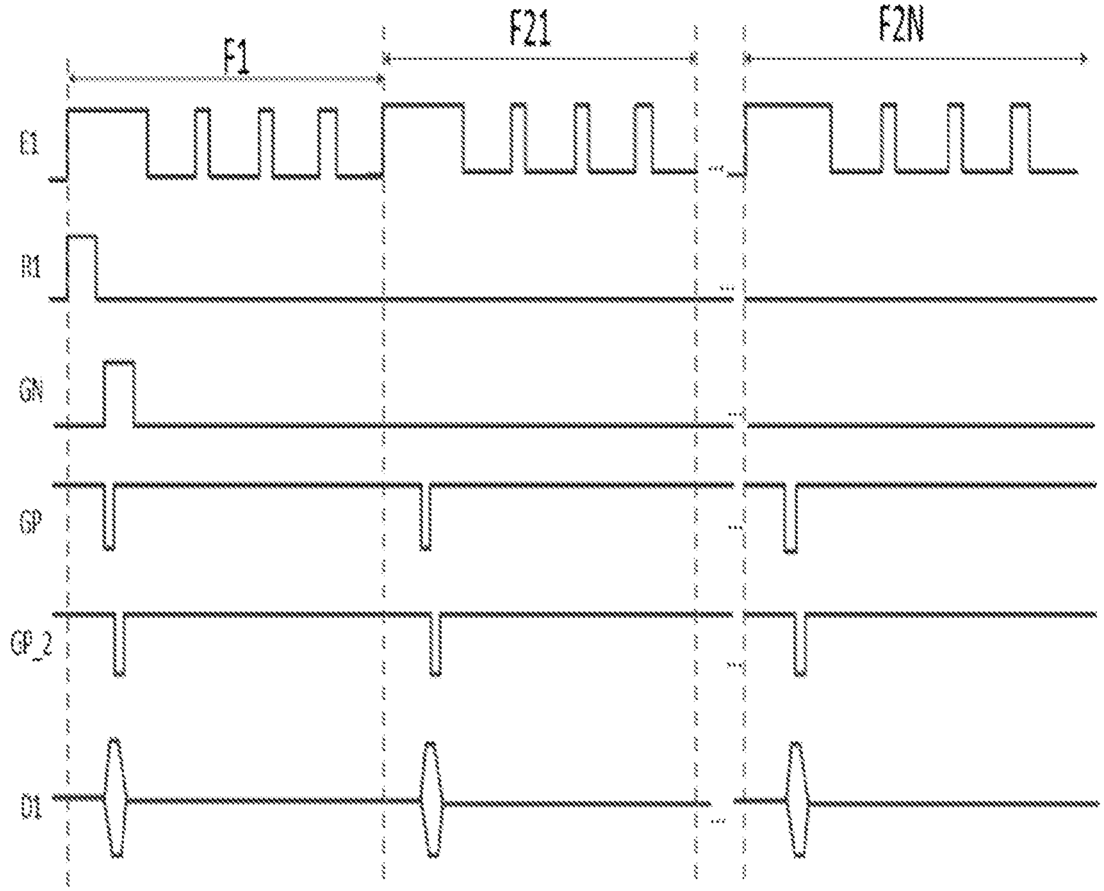
FIG. 13 is yet another sequence diagram of the pixel circuitry in FIG. 10.

As shown in FIG. 13, during the operation of the pixel circuitry in FIG. 10 in at least one embodiment of the present disclosure, when an image is displayed at a low frequency, a display frame includes a refresh display sub-frame F1 and at least one maintenance display sub-frame. Within the maintenance display sub-frame, the data line D1 provides a high voltage signal. A value of the high voltage signal from the data line D1 is equal to a value of a high voltage signal from the high voltage end VDD. For example, the high voltage signal is 4.6V. At the data write-in state within the maintenance display sub-frame, GP provides a low voltage, so as to turn on T5, thereby to write the high voltage signal into the first node N1. Within the maintenance display sub-frame, when E1 provides a low voltage signal. T1 and T2 are turned on, so as to enable T0 to drive O1 to emit light.

Because the value of the high voltage signal from the data line D1 is equal to the value of the high voltage signal from the high voltage end VDD within the maintenance display sub-frame, the potential at N1 is maintained as 4.6V even when a current leakage occurs for T5. In this way, when an image is displayed at different frequencies, it is able to maintain the potential at the first node N1, thereby to reduce the difference in the brightness values.

In FIGS. 12 and 13, F21 represents a first maintenance display sub-frame, and F2N represents an $N^{th}$ maintenance display sub-frame, where N is an integer greater than 1. S41 represents a data write-in stage within the first maintenance display sub-frame F21, and S4N represents a data write-in stage within the $N^{th}$ maintenance display sub-frame.

In FIG. 13. GP_2 represents a next write-in control line adjacent to GP, and a waveform corresponding to GP_2 is a waveform of a write-in control signal for a next row from the next write-in control line.

Figure 14:
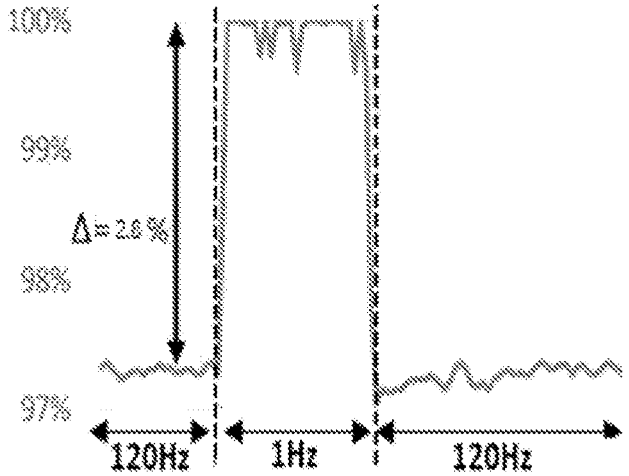
FIG. 14 is a curve diagram showing a difference in brightness of the pixel circuitry in FIG. 10 during the frequency switching.

As shown in FIG. 14, when the data line D1 provides a high voltage signal within the maintenance display sub-frame and the value of the high voltage signal is equal to that of the high voltage signal from the high voltage end VDD, a brightness change is 2.8% in the case that a refresh frequency is switched from 120 Hz to 1 Hz, i.e., the difference in the brightness values is reduced obviously during the frequency switching.

Figure 15:
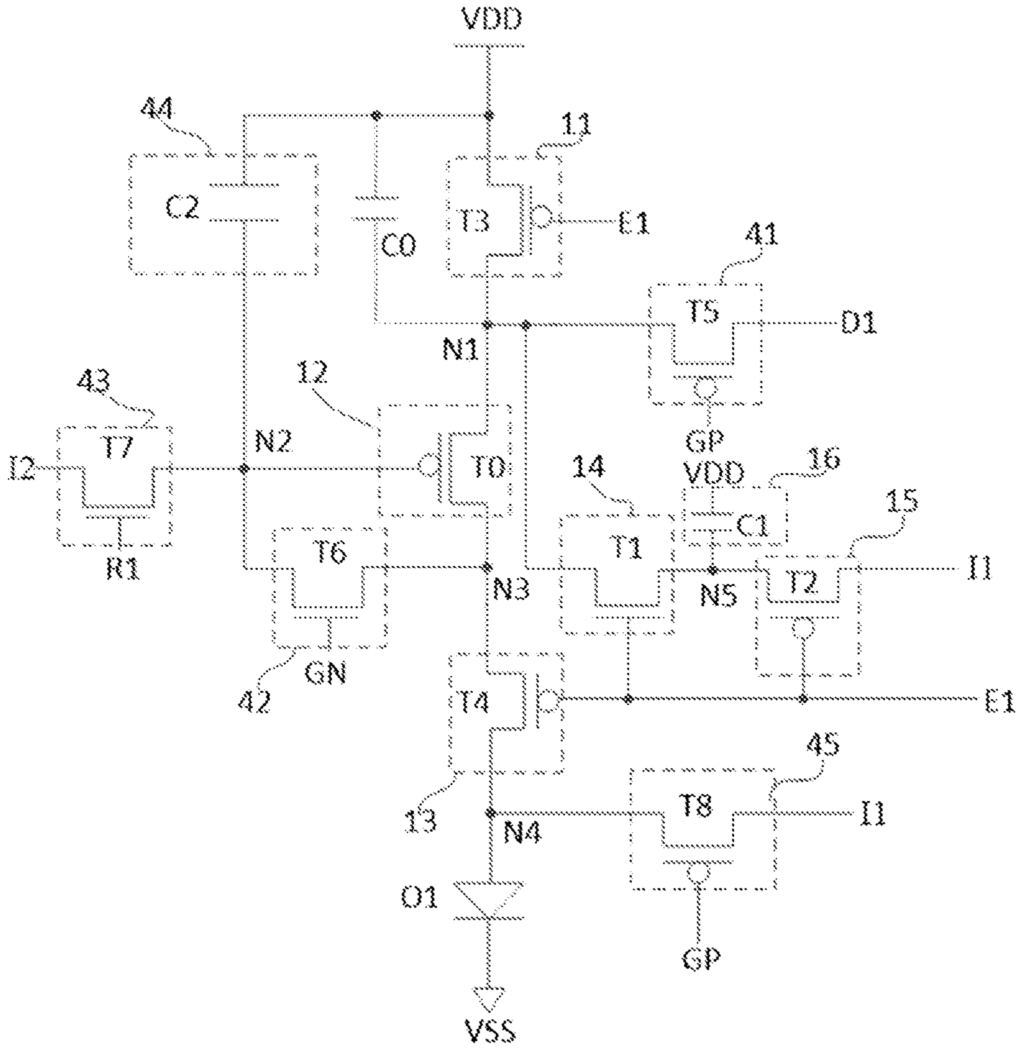
FIG. 15 is a circuit diagram of the pixel circuitry according to at least one embodiment of the present disclosure.

The pixel circuitry in FIG. 15 differs from that in FIG. 10 in that the drain electrode of T1 is electrically connected to the first node N1.

During the operation of the pixel circuitry in FIG. 15, at the light-emitting stage, E1 provides a low voltage signal, so as to turn off T1 and turn on T2, thereby to write the first initial voltage Vi1 into the fifth node N5, and C1 stores the first initial voltage Vi1 at the fifth node N5. At the non-light-emitting stage, E1 provides a high voltage signal, so as to turn on T1 and reset the potential at the first node N1 through Vi1 stored at the fifth node N5, thereby to enable the reset low potential to cancel out the superfluous electric charges accumulated at the first node N1 when the pixel circuitry enters the light-emitting stage again. In this way, it is able to inhibit such a phenomenon that the brightness values increase gradually within a same display period (the display period is a period for displaying one frame), thereby to suppress the occurrence of flicker.

When the pixel circuitry in FIG. 15 in at least one embodiment of the present disclosure is in a low-frequency display mode, a frequency of the write-in control signal from GP is smaller than a frequency of the light-emission control signal from E1, so as to reduce the power consumption.

Figure 16:
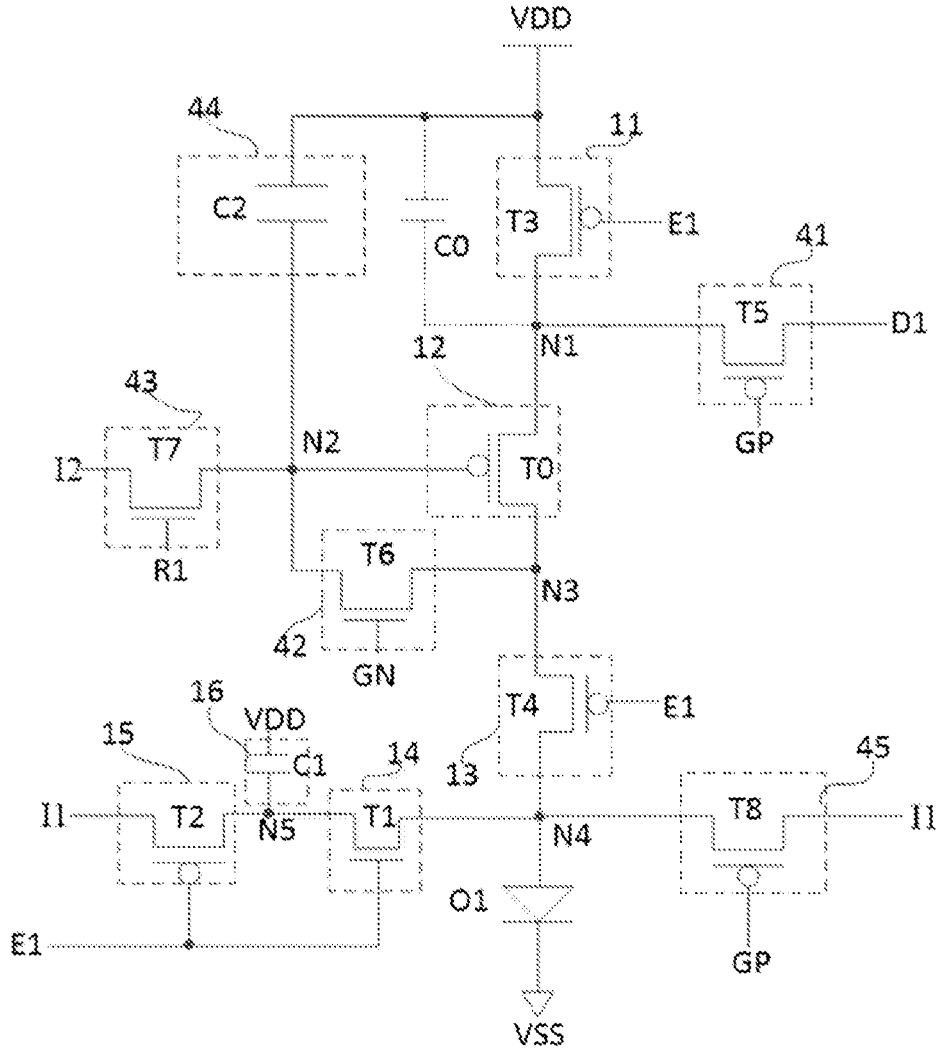
FIG. 16 is another circuit diagram of the pixel circuitry according to at least one embodiment of the present disclosure.

The pixel circuitry in FIG. 16 differs from that in FIG. 10 in that the drain electrode of T1 is electrically connected to the fourth node N4. During the operation of the pixel circuitry in FIG. 16, at the light-emitting stage, E1 provides a low voltage signal, so as to turn off T1 and turn on T2, thereby to write the first initial voltage Vi1 into the fifth node N5, and C1 stores the first initial voltage Vi1 at the fifth node N5. At the non-light-emitting stage, E1 provides a high voltage signal, so as to turn off T2, turn on T1, and reset the potential at the first node N1 through Vi1 stored at the fifth node N5, thereby to enable the reset low potential at the fourth node N4 to cancel out the superfluous electric charges accumulated at the first node N1 when the pixel circuitry enters the light-emitting stage again. In this way, it is able to inhibit such a phenomenon that the brightness values increase gradually within a same display period (the display period may be the period for displaying one frame), thereby to suppress the occurrence of flicker.

When the pixel circuitry in FIG. 16 in at least one embodiment of the present disclosure is in a low-frequency display mode, a frequency of the write-in control signal from GP is smaller than a frequency of the light-emission control signal from E1, so as to reduce the power consumption.

Figure 17:
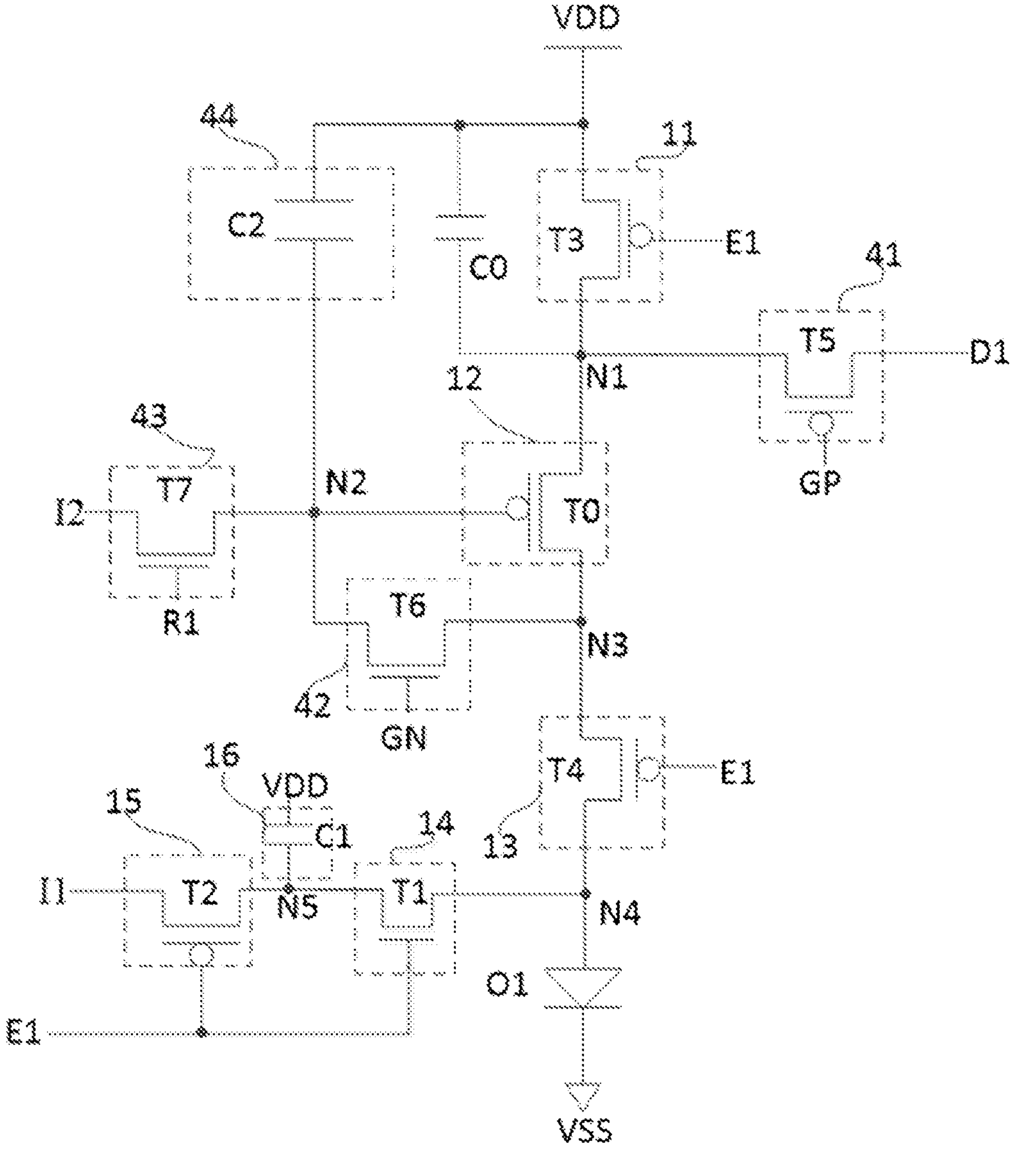
FIG. 17 is yet another circuit diagram of the pixel circuitry according to at least one embodiment of the present disclosure.

The pixel circuitry in FIG. 17 differs from that in FIG. 16 in that the pixel circuitry does not include the eighth transistor T8.

During the operation of the pixel circuitry in FIG. 17, at the light-emitting stage, E1 provides a low voltage signal, so as to turn off T1 and turn on T2, thereby to write the first initial voltage Vi1 into the fifth node N5. C1 stores the first initial voltage Vi1 at the fifth node N5. At the non-light-emitting stage. E1 provides a high voltage signal, so as to turn off T2, turn on T1, and reset the potential at the fourth node N4 by T1 through Vi1 stored at the fifth node N5, thereby to enable the reset low potential at the fourth node NA to cancel out the superfluous electric charges accumulated at the first node N1 when the pixel circuitry enters the light-emitting stage again. In this way, it is able to inhibit such a phenomenon that the brightness values increase gradually within a same display period (the display period may be the period for displaying one frame), thereby to suppress the occurrence of flicker.

When the pixel circuitry in FIG. 17 is in a low-frequency display mode, a frequency of the write-in control signal from GP is smaller than a frequency of the light-emission control signal from E1, so as to reduce the power consumption.

The present disclosure further provides in some embodiments a pixel driving method for the above-mentioned pixel circuitry. A display period includes a non-light-emitting stage and a light-emitting stage. The pixel driving method includes, at the non-light-emitting stage, applying, by a resetting control circuitry, a first initial voltage to a connection node under the control of a resetting control signal, so that superfluous electric charges accumulated at a first node are cancelled out by the first initial voltage at the connection node when the pixel circuitry enters the light-emitting stage again. In this way, it is able to inhibit such a phenomenon that the brightness values increase gradually within a same display period (the display period may be the period for displaying one frame), thereby to suppress the occurrence of flicker.

In a possible embodiment of the present disclosure, the resetting control circuitry includes a first control circuitry, a second control circuitry and a first energy storage circuitry. The pixel driving method includes: at the light-emitting stage, writing, by the second control circuitry, the first initial voltage into a fifth node under the control of the resetting control signal, and storing, by the first energy storage circuitry, the first initial voltage in the fifth node; and at the non-light-emitting stage, controlling, by the first control circuitry, the fifth node to be electrically connected to the connection node under the control of the resetting control signal, to write the first initial voltage into the connection node.

During the implementation, the resetting control circuitry includes a first control circuitry, a second control circuitry and a first energy storage circuitry. At the light-emitting stage, the second control circuitry writes the first initial voltage into the fifth node and the first energy storage circuitry stores the first initial voltage at the fifth node. At the non-light-emitting stage, the first control circuitry writes the first initial voltage into the connection node.

In at least one embodiment of the present disclosure, the pixel circuitry further includes a data write-in circuitry, a compensation control circuitry, a first initialization circuitry, a second energy storage circuitry and a second initialization circuitry. A first display stage of the display period includes an initialization stage, a compensation stage and the light-emitting stage arranged sequentially in that order, and the compensation stage includes a data write-in stage. The pixel driving method includes: at the initialization stage, writing, by the first initialization circuitry, a second initial voltage into a control end of a driving circuitry under the control of the resetting control signal, so that the driving circuitry controls a first node to be electrically connected to a third node at the beginning of the compensation stage under the control of a potential at a control end of the driving circuitry; at the data write-in stage, writing, by the data write-in circuitry, a data voltage Vdata from a data line into the first node under the control of a write-in control signal; at the compensation stage, controlling, by the compensation control circuitry, a second node to be electrically connected to the third node under the control of a compensation control signal; and at the light-emitting stage, controlling, by a first light-emission control circuitry, a first voltage end to be electrically connected to the first node under the control of a light-emission control signal, and controlling, by a second light-emission control circuitry, the third node to be electrically connected to the fourth node under the control of the light-emission control signal, so that the driving circuitry generates a driving current for driving a light-emitting element.

In at least one embodiment of the present disclosure, the pixel circuitry further includes a data write-in circuitry, the non-light-emitting stage includes a data write-in stage, a display frame includes a refresh display sub-frame and at least one maintenance display sub-frame, the refresh display sub-frame includes the display period, and the maintenance display sub-frame includes the display period. The pixel driving method further includes: within the maintenance display sub-frame, providing, by the data line, a first voltage signal; and at the data write-in stage within the maintenance display sub-frame, writing, by the data write-in circuitry, the first voltage signal into the first node under the control of the write-in control signal.

Within the maintenance display sub-frame, even when a current leakage occurs for a transistor of the data write-in circuitry, the potential at the first node is also maintained as a first voltage value (the first voltage value is a value of the first voltage signal), so as to maintain the potential at the first node as a same value when an image is displayed at different frequencies, thereby to reduce a difference in the brightness values.

In a possible embodiment of the present disclosure, the pixel circuitry further includes a compensation control circuitry, and the display period further includes a compensation stage. The pixel driving method further includes: at the data write-in stage within the refresh display sub-frame, providing, by the data line, a data voltage, and writing, by the data write-in circuitry, the data voltage into the first node under the control of the write-in control signal; at the compensation stage within the refresh display sub-frame, controlling, by the compensation control circuitry, the control end of the driving circuitry to be electrically connected to a second end of the driving circuitry under the control of the compensation control signal; at the light-emitting stage within the refresh display sub-frame and at the light-emitting stage within the maintenance display sub-frame, controlling, by the first light-emission control circuitry, the first voltage end to be electrically connected to the first node under the control of the light-emission control signal, and controlling, by the second light-emission control circuitry, the third node to be electrically connected to the fourth node under the control of the light-emission control signal, so that the driving circuitry generates the driving current for driving the light-emitting element; and within the maintenance display sub-frame, controlling, by the compensation control circuitry, the control end of the driving circuitry to be electrically disconnected from the second end of the driving circuitry under the control of the compensation control signal.

According to the pixel driving method in at least one embodiment of the present disclosure, at the light-emitting stage within the refresh display sub-frame and the light-emitting stage within the maintenance display sub-frame, the driving circuitry drives the light-emitting element to emit light, and within the maintenance display sub-frame, the compensation control circuitry controls the control end of the driving circuitry to be electrically disconnected from the second end of the driving circuitry. In this regard, even when the transistor of the data write-in circuitry is turned on in a special time period within the maintenance display sub-frame, the control end of the driving circuitry is not electrically connected to the second end of the driving circuitry, so the display brightness may not be adversely affected.

In a possible embodiment of the present disclosure, within the display frame, a frequency of the write-in control signal is smaller than a frequency of the light-emission control signal.

In at least one embodiment of the present disclosure, when the pixel circuitry is operated in a low-frequency display mode, the display frame includes a refresh display sub-frame and at least one maintenance display sub-frame, and within the display frame, a frequency of the write-in control signal is smaller than a frequency of the light-emission control signal, so as to reduce the power consumption.

The present disclosure further provides in some embodiments a display device including the above-mentioned pixel circuitry.

In the embodiments of the present disclosure, the display device may be any product or member having a display function, e.g., mobile phone, tablet computer, television, display, laptop computer, digital photo frame or navigator.

The above are preferred embodiments of the present disclosure. It should be noted that a person skilled in the art may implement various improvements and modifications without departing from the principle of the present disclosure. These improvements and modifications should also fall within the protection scope of the present disclosure.

What is claimed is:

1. A pixel circuitry, comprising a first light-emission control circuitry, a driving circuitry, a second light-emission control circuitry, a resetting control circuitry and a light-emitting element, wherein the first light-emission control circuitry is electrically connected to a light-emission control line, a first voltage end and a first node, and configured to control the first voltage end to be electrically connected to or electrically disconnected from the first node under the control of a light-emission control signal from the light-emission control line;

a control end of the driving circuitry is electrically connected to a second node, a first end of the driving circuitry is electrically connected to the first node, and a second end of the driving circuitry is electrically connected to a third node;

the driving circuitry is configured to generate a driving current for driving the light-emitting element under the control of a potential at the control end;

the second light-emission control circuitry is electrically connected to the light-emission control line, the third node and a fourth node, and configured to control the third node to be electrically connected to or electrically disconnected from the fourth node under the control of the light-emission control signal;

a first electrode of the light-emitting element is electrically connected to the fourth node, and a second electrode of the light-emitting element is electrically connected to a second voltage end;

the resetting control circuitry is electrically connected to a resetting control line, a connection node and a first initial voltage end for providing a first initial voltage, and configured to provide the first initial voltage to the connection node under the control of a resetting control signal from the resetting control line;

the connection node is the first node, the third node or the fourth node;

the resetting control circuitry is further electrically connected to a fifth node, and configured to, under the control of the resetting control signal, control the first initial voltage end to be electrically connected to or electrically disconnected from the fifth node, and control the fifth node to be electrically connected to or electrically disconnected from the connection node, and maintain a potential at the fifth node;

the resetting control circuitry comprises a first energy storage circuitry;

the first energy storage circuitry is electrically connected to the fifth node, and configured to store electric energy;

the fifth node does not directly connected to the second node; and the first energy storage circuitry comprises a first capacitor; a first end of the first capacitor is directly connected to the fifth node, and a second end of the first capacitor is electrically connected to the first voltage end.

2. The pixel circuitry according to claim 1, wherein the resetting control circuitry further comprises a first control circuitry, and a second control circuitry;

the first control circuitry is electrically connected to the resetting control line, the connection node and the fifth node, and configured to control the connection node to be electrically connected to or electrically disconnected from the fifth node under the control of the resetting control signal;

the second control circuitry is electrically connected to the resetting control line, the fifth node and the first initial voltage end, and configured to write the first initial voltage from the first initial voltage end into the fifth node under the control of the resetting control signal.

3. The pixel circuitry according to claim 2, wherein the first control circuitry comprises a first transistor and the second control circuitry comprises a second transistor;

a control electrode of the first transistor is electrically connected to the resetting control line, a first electrode of the first transistor is electrically connected to the fifth node, and a second electrode of the first transistor is electrically connected to the third node;

a control electrode of the second transistor is electrically connected to the resetting control line, a first electrode of the second transistor is electrically connected to the first initial voltage end, and a second electrode of the second transistor is electrically connected to the fifth node.

4. The pixel circuitry according to claim 3, wherein the first transistor is an oxide thin film transistor, and the second transistor is a low temperature poly-silicon thin film transistor.

5. The pixel circuitry according to claim 1, wherein the resetting control line is the light-emission control line, or the resetting control signal from the resetting control line is same as the light-emission control signal from the light-emission control line.

6. The pixel circuitry according to claim 1, further comprising a data write-in circuitry, a compensation control circuitry, a first initialization circuitry, a second energy storage circuitry and a second initialization circuitry;

the data write-in circuitry is electrically connected to a write-in control line, a data line and the first node, and configured to write a data voltage from the data line into the first node under the control of a write-in control signal from the write-in control line;

the compensation control circuitry is electrically connected to a compensation control line, the control end of the driving circuitry and the second end of the driving circuitry, and configured to control the control end of the driving circuitry to be electrically connected to or electrically disconnected from the second end of the driving circuitry under the control of a compensation control signal from the compensation control line;

the first initialization circuitry is electrically connected to an initialization control line, a second initial voltage end and the control end of the driving circuitry, and configured to write a second initial voltage from the second initial voltage end into the control end of the driving circuitry under the control of an initialization control signal from the initialization control line;

the second energy storage circuitry is electrically connected to the control end of the driving circuitry, and configured to store electric energy;

the second initialization circuitry is electrically connected to the write-in control line, a third initial voltage end and the fourth node, and configured to write a third initial voltage from the third initial voltage end into the fourth node under the control of the write-in control signal.

7. The pixel circuitry according to claim 6, wherein the data write-in circuitry comprises a fifth transistor, the compensation control circuitry comprises a sixth transistor, the first initialization circuitry comprises a seventh transistor, the second initialization circuitry comprises an eighth transistor, and the second energy storage circuitry comprises a second capacitor;

a control electrode of the fifth transistor is electrically connected to the write-in control line, a first electrode of the fifth transistor is electrically connected to the data line, and a second electrode of the fifth transistor is electrically connected to the first end of the driving circuitry;

a control electrode of the sixth transistor is electrically connected to the compensation control line, a first electrode of the sixth transistor is electrically connected to the control end of the driving circuitry, and a second electrode of the sixth transistor is electrically connected to the second end of the driving circuitry;

a control electrode of the seventh transistor is electrically connected to the initialization control line, a first electrode of the seventh transistor is electrically connected to the second initial voltage end, and a second electrode of the seventh transistor is electrically connected to the control end of the driving circuitry;

a control electrode of the eighth transistor is electrically connected to the write-in control line, a first electrode of the eighth transistor is electrically connected to the third initial voltage end, and a second electrode of the eighth transistor is electrically connected to the fourth node;

a first end of the second capacitor is electrically connected to the second node, and a second end of the second capacitor is electrically connected to the first voltage end.

8. The pixel circuitry according to claim 1, wherein the first light-emission control circuitry comprises a third transistor, the second light-emission control circuitry comprises a fourth transistor, and the driving circuitry comprises a driving transistor;

a control electrode of the third transistor is electrically connected to the light-emission control line, a first electrode of the third transistor is electrically connected to the first voltage end, and a second electrode of the third transistor is electrically connected to the first node;

a control electrode of the fourth transistor is electrically connected to the light-emission control line, a first electrode of the fourth transistor is electrically connected to the third node, and a second electrode of the fourth transistor is electrically connected to the fourth node;

a control electrode of the driving transistor is electrically connected to the second node, a first electrode of the driving transistor is electrically connected to the first node, and a second electrode of the driving transistor is electrically connected to the third node.

9. A pixel driving method for the pixel circuitry according to claim 1, wherein a display period comprises a non-light-emitting stage and a light-emitting stage, and the pixel driving method comprises:

at the non-light-emitting stage, applying, by the resetting control circuitry, the first initial voltage to the connection node under the control of a resetting control signal.

10. The pixel driving method according to claim 9, wherein the resetting control circuitry further comprises a first control circuitry and the second control circuitry; wherein the pixel driving method comprises:

at the light-emitting stage, writing, by the second control circuitry, the first initial voltage into the fifth node under the control of the resetting control signal, and storing, by the first energy storage circuitry, the first initial voltage in the fifth node; and at the non-light-emitting stage, controlling, by the first control circuitry, the fifth node to be electrically connected to the connection node under the control of the resetting control signal, to write the first initial voltage into the connection node.

11. The pixel driving method according to claim 9, wherein the pixel circuitry further comprises a data write-in circuitry, a compensation control circuitry, a first initialization circuitry, a second energy storage circuitry and a second initialization circuitry; a first display stage of the display period comprises an initialization stage, a compensation stage and the light-emitting stage arranged sequentially in that order, and the compensation stage comprises a data write-in stage; the pixel driving method comprises:

at the initialization stage, writing, by the first initialization circuitry, a second initial voltage into a control end of a driving circuitry under the control of the resetting control signal, to enable the driving circuitry to control a first node to be electrically connected to a third node at the beginning of the compensation stage under the control of a potential at a control end of the driving circuitry;

at the data write-in stage, writing, by the data write-in circuitry, a data voltage Vdata from a data line into the first node under the control of a write-in control signal;

at the compensation stage, controlling, by the compensation control circuitry, a second node to be electrically connected to the third node under the control of a compensation control signal;

at the light-emitting stage, controlling, by a first light-emission control circuitry, a first voltage end to be electrically connected to the first node under the control of a light-emission control signal, and controlling, by a second light-emission control circuitry, the third node to be electrically connected to the fourth node under the control of the light-emission control signal; generating, by the driving circuitry, a driving current for driving a light-emitting element.

12. The pixel driving method according to claim 9, wherein the pixel circuitry further comprises a data write-in circuitry, the non-light-emitting stage comprises a data write-in stage, a display frame comprises a refresh display sub-frame and at least one maintenance display sub-frame, the refresh display sub-frame comprises the display period, and the maintenance display sub-frame comprises the display period; wherein the pixel driving method further comprises:

within the maintenance display sub-frame, providing, by the data line, a first voltage signal;

at the data write-in stage within the maintenance display sub-frame, writing, by the data write-in circuitry, the first voltage signal into the first node under the control of the write-in control signal.

13. The pixel driving method according to claim 12, wherein the pixel circuitry further comprises a compensation control circuitry, and the display period further comprises a compensation stage; the pixel driving method further comprises:

at the data write-in stage within the refresh display sub-frame, providing, by the data line, a data voltage, and writing, by the data write-in circuitry, the data voltage into the first node under the control of the write-in control signal;

at the compensation stage within the refresh display sub-frame, controlling, by the compensation control circuitry, the control end of the driving circuitry to be electrically connected to a second end of the driving circuitry under the control of the compensation control signal;

at the light-emitting stage within the refresh display sub-frame and at the light-emitting stage within the maintenance display sub-frame, controlling, by the first light-emission control circuitry, the first voltage end to be electrically connected to the first node under the control of the light-emission control signal, and controlling, by the second light-emission control circuitry, the third node to be electrically connected to the fourth node under the control of the light-emission control signal; generating, by the driving circuitry, generates the driving current for driving the light-emitting element;

within the maintenance display sub-frame, controlling, by the compensation control circuitry, the control end of the driving circuitry to be electrically disconnected from the second end of the driving circuitry under the control of the compensation control signal.

14. The pixel driving method according to claim 13, wherein within the display frame, a frequency of the write-in control signal is smaller than a frequency of the light-emission control signal.

15. A display device, comprising the pixel circuitry according to claim 1.

16. The display device according to claim 15, wherein the resetting control circuitry is further electrically connected the fifth node, and configured to, under the control of the resetting control signal, control the first initial voltage end to be electrically connected to or electrically disconnected from the fifth node, and control the fifth node to be electrically connected to or electrically disconnected from the connection node, and maintain a potential at the fifth node.

17. The display device according to claim 16, wherein the resetting control circuitry comprises a first control circuitry and the second control circuitry;

the first control circuitry is electrically connected to the resetting control line, the connection node and the fifth node, and configured to control the connection node to be electrically connected to or electrically disconnected from the fifth node under the control of the resetting control signal; and the second control circuitry is electrically connected to the resetting control line, the fifth node and the first initial voltage end, and configured to write the first initial voltage from the first initial voltage end into the fifth node under the control of the resetting control signal.

18. The display device according to claim 15, wherein the resetting control line is the light-emission control line, or the resetting control signal from the resetting control line is same as the light-emission control signal from the light-emission control line.

* * * * *